US012368947B2

(12) United States Patent
Zeng et al.

(10) Patent No.: US 12,368,947 B2
(45) Date of Patent: Jul. 22, 2025

(54) IMAGING METHOD FOR NON-LINE-OF-SIGHT OBJECT AND ELECTRONIC DEVICE

(71) Applicant: Huawei Technologies Co., Ltd., Shenzhen (CN)

(72) Inventors: Kun Zeng, Chengdu (CN); Ziming Yu, Chengdu (CN); Jia He, Chengdu (CN); Guangjian Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

(21) Appl. No.: 17/902,550

(22) Filed: Sep. 2, 2022

(65) Prior Publication Data

US 2022/0417447 A1 Dec. 29, 2022

Related U.S. Application Data

(63) Continuation of application No. PCT/CN2021/075620, filed on Feb. 5, 2021.

(30) Foreign Application Priority Data

Mar. 6, 2020 (CN) ......................... 202010152946.5

(51) Int. Cl.
*G06F 3/01* (2006.01)
*G06V 10/58* (2022.01)
(Continued)

(52) U.S. Cl.
CPC .......... *H04N 23/632* (2023.01); *G06V 10/58* (2022.01); *H04N 23/667* (2023.01)

(58) Field of Classification Search
CPC ...... H04N 23/631; H04N 23/95; H04N 23/62; H04N 23/17; H04N 23/20; H04N 23/30;
(Continued)

(56) References Cited

U.S. PATENT DOCUMENTS 6,972,714 B1 * 12/2005 Baharav .................. G01S 13/89 342/55
9,189,428 B2 * 11/2015 Pollmann ............. G06F 3/0227
(Continued)

FOREIGN PATENT DOCUMENTS

CN 100465628 C 3/2009
CN 201322681 Y 10/2009
(Continued)

*Primary Examiner* — Philip P. Dang
(74) *Attorney, Agent, or Firm* — Slater Matsil, LLP

(57) ABSTRACT

Certain embodiments provide an imaging method for a non-line-of-sight object and an electronic device. In certain embodiments, the method includes: detecting a first input operation; and generating first image data in response to the first input operation. The first image data is imaging data of the non-line-of-sight object obtained by fusing second image data and third image data. The first image data includes position information between the non-line-of-sight object and a line-of-sight object. The second image data is imaging data of the line-of-sight object captured by the optical camera. The third image data is imaging data of the non-line-of-sight object captured by the electromagnetic sensor.

20 Claims, 13 Drawing Sheets

Mobile phone 100
Antenna 1 150 Antenna 2 160
Mobile communication module 2G/3G/4G/5G
Wireless communication module BT/WLAN/GNSS/NFC/IR/FM
170A Speaker
170B Receiver
170C Microphone
170D Headset jack
170 Audio module
194 Displays 1 to N
193 Cameras 1 to N
192 Indicator
191 Motor
190 Button
121 Internal memory
195 SIM card interfaces 1 to N
120 External memory interface
110 Processor
180 Sensor module
180A Pressure sensor
180B Gyro sensor
180C Barometric pressure sensor
180D Magnetic sensor
180E Acceleration sensor
180F Distance sensor
180G Optical proximity sensor
180H Fingerprint sensor
180J Temperature sensor
180K Touch sensor
180L Ambient light sensor
180M Bone conduction sensor
130 USB interface
Charging input
140 Charging management module
141 Power management module
142 Battery

(51) Int. Cl.
*H04N 23/63* (2023.01)
*H04N 23/667* (2023.01)

(58) Field of Classification Search
CPC ...... H04N 23/667; H04N 23/10; H04N 23/13; H04N 23/632; G06T 2207/30112; G06T 7/55; G01S 13/867; G01S 13/888; G01S 13/89; G01S 13/865; G06V 10/806; G06V 10/58
See application file for complete search history.

(56) References Cited

U.S. PATENT DOCUMENTS

| | | | | |
|---|---|---|---|---|
| 9,866,951 | B2 * | 1/2018 | Trestain | H04R 1/323 |
| 11,377,099 | B2 * | 7/2022 | Shoda | B60K 35/80 |
| 11,709,593 | B2 * | 7/2023 | Chung | G06F 3/0304<br>715/773 |
| 2003/0202691 | A1 * | 10/2003 | Beardsley | G06T 7/85<br>382/296 |
| 2011/0102234 | A1 | 5/2011 | Adams et al. | |
| 2013/0194127 | A1 | 8/2013 | Ishihara et al. | |
| 2014/0168007 | A1 | 6/2014 | Wang et al. | |
| 2018/0038981 | A1 | 2/2018 | Mrvaljevic et al. | |
| 2018/0092698 | A1 * | 4/2018 | Chopra | A61B 90/39 |
| 2019/0014016 | A1 * | 1/2019 | Kumano | H04L 43/022 |
| 2020/0092625 | A1 * | 3/2020 | Raffle | H04R 1/026 |
| 2024/0104861 | A1 * | 3/2024 | DeDonato | G06F 3/012 |
| 2024/0152244 | A1 * | 5/2024 | DeDonato | G06F 1/163 |
| 2024/0221186 | A1 * | 7/2024 | John Wilson | G06T 7/251 |
| 2024/0320930 | A1 * | 9/2024 | Ravasz | G06T 19/006 |
| 2024/0411421 | A1 * | 12/2024 | Pastrana Vicente | G06F 3/011 |

FOREIGN PATENT DOCUMENTS

| | | | |
|---|---|---|---|
| CN | 102506757 | A | 6/2012 |
| CN | 205539666 | U | 8/2016 |
| CN | 109785381 | A | 5/2019 |
| CN | 110515068 | A | 11/2019 |
| CN | 110736986 | A | 1/2020 |
| CN | 210006190 | U | 1/2020 |
| DE | 102017106931 | A1 | 10/2017 |
| JP | 2006261900 | A | 9/2006 |

* cited by examiner

IMAGING METHOD FOR NON-LINE-OF-SIGHT OBJECT AND ELECTRONIC DEVICE

CROSS-REFERENCE TO RELATED APPLICATIONS

This application is a continuation of International Application No. PCT/CN2021/075620, filed on Feb. 5, 2021, which claims priority to Chinese Patent Application No. 202010152946.5, filed on Mar. 6, 2020. The disclosures of the aforementioned applications are hereby incorporated by reference in their entireties.

TECHNICAL FIELD

This application relates to the field of terminal technologies, and in particular, to an imaging method for a non-line-of-sight object and an electronic device.

BACKGROUND

Because an electromagnetic wave can penetrate a part of a surface of an object, the electromagnetic wave is usually used to detect an internal structure of the object or detect a non-line-of-sight (NLOS) object, and image the object. Therefore, the electromagnetic wave may be widely used in technical fields such as medicine and security check. An imaging principle of the electromagnetic wave is to actively or passively detect a to-be-imaged target, for example, reconstruct a shape and a feature of an object, to form an image.

However, it is more difficult to perform electromagnetic imaging on some materials. As shown in (a) in FIG. 1, there are a pair of scissors in a paper bag, and the scissors are NLOS objects. Because the scissors are NLOS objects and are invisible, the scissors are shown by using dashed lines in (a) in FIG. 1. (b) in FIG. 1 is an electromagnetic wave imaging result of (a) in FIG. 1. It can be seen from (b) in FIG. 1 that an image of the scissors can be basically seen, but imaging effect of the paper bag is poor, that is, the paper bag cannot be seen. In this way, a position of the scissors in the paper bag cannot be located.

SUMMARY

This application provides an imaging method for a non-line-of-sight object and an electronic device, so that the non-line-of-sight object can be clearer in imaging space.

According to a first aspect, an embodiment of this application provides an imaging method for a non-line-of-sight object, and the method may be performed by an electronic device. The electronic device is, for example, a mobile phone or a tablet computer, and may include an optical camera and an electromagnetic sensor. The method includes: detecting a first input operation; and generating first image data in response to the first input operation. The first image data is imaging data of the non-line-of-sight object obtained by fusing second image data and third image data. The first image data includes position information between the non-line-of-sight object and a line-of-sight object. The second image data is imaging data of the line-of-sight object captured by the optical camera. The third image data is imaging data of the non-line-of-sight object captured by the electromagnetic sensor.

In this solution, in a scenario in which the electronic device photographs the non-line-of-sight object, the electronic device may fuse an image (that is, the second image data) of the line-of-sight object captured by the optical camera and an image (that is, the third image data) of the non-line-of-sight object captured by the electromagnetic sensor, to obtain the first image data. Because the first image data includes the position information of the non-line-of-sight object and the line-of-sight object, and can represent a relative position relationship between the non-line-of-sight object and the line-of-sight object, a position of the non-line-of-sight object in imaging space can be displayed more clearly.

In a possible design, the position information includes one or more of the following information: plane position information, where the plane position information includes a plane relative position relationship between the non-line-of-sight object and the line-of-sight object; space position information, where the space position information includes a space relative position relationship between the non-line-of-sight object and the line-of-sight object; and size proportion information of the non-line-of-sight object and the line-of-sight object.

The three types of position information listed above may all represent the relative position relationship between the non-line-of-sight object and the line-of-sight object. Certainly, the first image data may include one or more of the three types of position information, to more clearly represent the relative position between the non-line-of-sight object and the line-of-sight object.

In a possible design, before a display interface of the electronic device displays the first image data, the method further includes: performing N times of feature information extraction on the second image data to obtain N pieces of first feature information, where N is an integer greater than or equal to 1; and/or perform M times of feature information extraction on the third image data to obtain M pieces of second feature information, where M is an integer greater than or equal to 1; and fusing the second image data and the third image data based on first reference information of the second image data, second reference information of the third image data, and the N pieces of first feature information and/or the M pieces of second feature information, to obtain the first image data, where the position information includes the N pieces of first feature information and/or the M pieces of second feature information, and the first reference information and the second reference information indicate a relative position relationship between the non-line-of-sight object and the line-of-sight object.

In some embodiments, the first feature information includes the first reference information, the second feature information includes the second reference information, and the position information includes the first reference information and/or the second reference information.

It should be understood that the first feature information is a portion of visualization information of the line-of-sight object, and the second feature information is a portion of visualization information of the non-line-of-sight object. Therefore, the first feature information and the second feature information may represent the relative position relationship between the non-line-of-sight object and the line-of-sight object. In other words, the position information may include the first feature information and/or the second feature information. Further, the first feature information may include the first reference information, for example, first reference position coordinates established in the second image data. The second feature information may include the second reference information, for example, second reference position coordinates established in the third image data. A position of each piece of first feature information relative to the first reference position coordinates is relatively fixed, a position of each piece of second feature information relative to the second reference position coordinates is also relatively fixed, and the first reference position coordinates are also fixed relative to the second reference position coordinates. Therefore, the second image data and the third image data may be correspondingly fused based on the first reference position coordinates and the second reference position coordinates, to obtain the first image data. It should be understood that the position information included in the first image data may include the first reference information and/or the second reference information.

In a possible design, before the detecting a first input operation, the method further includes: detecting a second input operation, and starting the optical camera in response to the second input operation; or detecting the second input operation, and starting the optical camera and the electromagnetic sensor in response to the second input operation; or detecting the second input operation, starting the optical camera in response to the second input operation, detecting a third input operation, and starting the electromagnetic sensor in response to the third input operation; or detecting the second input operation, starting the optical camera in response to the second input operation, determining that a to-be-photographed scene is a macro scenario, and starting the electromagnetic sensor, where the macro scenario is a scene in which a distance between the electronic device and a to-be-photographed object is less than a preset threshold.

In some embodiments, the electromagnetic sensor may be integrated with an antenna of the electronic device, that is, the electromagnetic sensor is already in an operating state. In this case, when there is the non-line-of-sight object, the electronic device starts the optical camera based on an input operation of the user. In some other embodiments, the electromagnetic sensor is independent of the antenna of the electronic device. In this case, when photographing an object, the electronic device may first start the optical camera, and then determine, based on whether the to-be-photographed object is the non-line-of-sight object, whether to start the electromagnetic sensor. For example, when photographing the non-line-of-sight object, the electromagnetic sensor may be started based on the input operation of the user, or the electromagnetic sensor may be automatically started based on whether an identified photographing scenario is the macro scenario. This is more flexible.

In a possible design, after responding to the first input operation, the method further includes: detecting a third input operation; and starting a multi-angle mode in response to the third input operation, where the multi-angle mode is a mode in which the non-line-of-sight object is photographed from a plurality of angles of view.

In another possible design, after responding to the first input operation, the method further includes: determining to photograph the non-line-of-sight object from a plurality of angles of view, and starting a multi-angle mode, where the multi-angle mode is a mode in which the non-line-of-sight object is photographed from the plurality of angles of view.

It should be understood that a volume of the line-of-sight object and/or the non-line-of-sight object that are/is to be photographed by the electronic device is large. To obtain more information about the line-of-sight object and/or the non-line-of-sight object that are/is to be photographed, the line-of-sight object and/or the non-line-of-sight object may be photographed from the plurality of angles of view. In actual application, the user may actively select the multi-angle mode, or the electronic device itself determines whether to enter the multi-angle mode.

In a possible design, the determining to photograph the non-line-of-sight object from a plurality of angles of view includes: if determining that a movement path of the electronic device within preset duration is greater than a first preset threshold, determining to photograph the non-line-of-sight object from the plurality of angles of view; or if determining that a rotation angle of the electronic device within preset duration is greater than a second preset threshold, determining to photograph the non-line-of-sight object from the plurality of angles of view.

It should be understood that, if the non-line-of-sight object is high, a space displacement is large when the electronic device photographs the non-line-of-sight object. Therefore, whether to photograph the non-line-of-sight object from the plurality of angles of view may be determined based on an amount of the space displacement of the electronic device. For another example, if the non-line-of-sight object is a polyhedron, a rotation amplitude of the electronic device is large when the electronic device photographs the non-line-of-sight object. Therefore, whether to photograph the non-line-of-sight object from the plurality of angles of view may be determined based on a magnitude of a rotation angle of the electronic device.

In a possible design, after the determining to photograph the non-line-of-sight object from the plurality of angles of view, the method further includes: outputting first prompt information, where the first prompt information prompts whether to perform multi-angle photographing; and when an instruction for determining to perform multi-angle photographing is received, determining to photograph the non-line-of-sight object from the plurality of angles of view.

It should be understood that, when the electronic device actively determines whether to photograph the non-line-of-sight object from the plurality of angles of view, the electronic device may perform false determining. For example, although the electronic device moves, the electronic device is only used for initial positioning of photographing. Therefore, it is more appropriate for the electronic device to prompt a user whether to perform multi-angle photographing.

In a possible design, after the starting the multi-angle mode, the method further includes: displaying auxiliary prompt information in a display interface, where the auxiliary prompt information includes one or a combination of a straight line, a curve, or a rotation angle.

It should be understood that, in the multi-angle mode, the electronic device may display, in the display interface, a rule for the user to follow to move the electronic device, for example, move the electronic device in a horizontal direction or rotate the electronic device, to ensure that the second image data and the third image data that are obtained from each angle of view can be obtained as much as possible, and ensure fusion performance of the second image data and the third image data.

In a possible design, after responding to the first input operation, the method further includes: displaying the second image data and/or the third image data in the display interface; outputting second prompt information, where the second prompt information prompts whether to fuse the second image data and the third image data; and fusing the second image data and the third image data when an instruction for fusing the second image data and the third image data is received.

It should be understood that, the electronic device may falsely determine, by automatically identifying the photographing scenario, whether to photograph the non-line-of-sight object. Therefore, the electronic device further prompts whether to fuse the second image data and the third image data, so that unnecessary fusion caused by false determining can be avoided, and user experience can be improved.

In a possible design, after the responding to the first input operation, the method further includes: detecting a fourth input operation, and in response to the fourth input operation, deleting the second image data and/or the third image data; or deleting the second image data and/or the third image data.

It should be understood that the electronic device may store the second image data and the third image data. If the user cares about the first image data but does not care about the second image data and the third image data, the second image data and the third image data may be deleted, to save storage space as much as possible. For example, the electronic device may delete the second image data and/or the third image data by default, or the electronic device may delete the second image data and/or the third image data based on a user specification, and store the second image data and/or the third image data that the user wants, to facilitate viewing by the user and improve user experience.

According to a second aspect, an embodiment of this application provides an electronic device, including a processor, an optical camera, and an electromagnetic sensor. The processor is configured to start the optical camera in response to a detected first input operation. The optical camera is configured to capture first image data of a line-of-sight object. The electromagnetic sensor is configured to capture second image data of a non-line-of-sight object. The processor is further configured to fuse the first image data and the second image data to generate third image data, where the third image data is imaging data of the non-line-of-sight object obtained by fusing the first image data and the second image data, and the third image data includes position information between the non-line-of-sight object and the line-of-sight object.

In a possible design, the electronic device further includes: an input component, configured to detect the first input operation; and a display, configured to display, in a display interface, an image formed by the third image data.

In a possible design, the position information includes plane position information and/or space position information. The plane position information includes a plane relative position relationship between the non-line-of-sight object and the line-of-sight object. The space position information includes a space relative position relationship between the non-line-of-sight object and the line-of-sight object.

In a possible design, the position information includes size proportion information of the non-line-of-sight object and the line-of-sight object.

In a possible design, the processor is further configured to: perform N times of feature information extraction on the second image data to obtain N pieces of first feature information, where N is an integer greater than or equal to 1; and/or perform M times of feature information extraction on the third image data to obtain M pieces of second feature information, where M is an integer greater than or equal to 1; and fuse the second image data and the third image data based on first reference information of the second image data, second reference information of the third image data, and the N pieces of first feature information and/or the M pieces of second feature information, to obtain the first image data, where the position information includes the N pieces of first feature information and/or the M pieces of second feature information, and the first reference information and the second reference information indicate a relative position relationship between the non-line-of-sight object and the line-of-sight object.

In a possible design, the first feature information includes the first reference information, the second feature information includes the second reference information, and the position information includes the first reference information and/or the second reference information.

In a possible design, before detecting the first input operation, the processor is specifically configured to: detect a second input operation, and start the optical camera in response to the second input operation; or detect the second input operation, and start the optical camera and the electromagnetic sensor in response to the second input operation; or detect the second input operation, start the optical camera in response to the second input operation, detect a third input operation, and start the electromagnetic sensor in response to the third input operation; or detect the second input operation, start the optical camera in response to the second input operation, determine that a to-be-photographed scene is a macro scenario, and start the electromagnetic sensor, where the macro scenario is a scene in which a distance between the electronic device and a to-be-photographed object is less than a preset threshold.

In a possible design, after detecting the first input operation, the processor is further configured to: detect a third input operation; and start a multi-angle mode in response to the third input operation, where the multi-angle mode is a mode in which the non-line-of-sight object is photographed from a plurality of angles of view.

In a possible design, the electronic device further includes a posture sensor and/or an acceleration sensor, and the processor is further configured to: before the display interface of the electronic device displays the first image data, determine to photograph the non-line-of-sight object from a plurality of angles of view, and start a multi-angle mode, where the multi-angle mode is a mode in which the non-line-of-sight object is photographed from the plurality of angles of view.

In a possible design, the processor is specifically configured to: if determining that a movement path of the electronic device within preset duration is greater than a first preset threshold, determine to photograph the non-line-of-sight object from the plurality of angles of view; or if it is determining that a rotation angle of the electronic device within preset duration is greater than a second preset threshold, determine to photograph the non-line-of-sight object from the plurality of angles of view.

In a possible design, the processor is specifically configured to: output first prompt information, where the first prompt information prompts whether to perform multi-angle photographing; and when an instruction for determining to perform multi-angle photographing is received, determine to photograph the non-line-of-sight object from the plurality of angles of view.

In a possible design, the processor is further configured to: after the multi-angle mode is started, display auxiliary prompt information in the display interface, where the auxiliary prompt information includes one or a combination of a straight line, a curve, or a rotation angle.

In a possible design, the processor is further configured to: display the second image data or the third image data in the display interface, and output second prompt information, where the second prompt information prompts whether to fuse the second image data and the third image data; and fuse the second image data and the third image data when an instruction for fusing the second image data and the third image data is received.

In a possible design, the processor is further configured to: detect a fourth input operation, and in response to the fourth input operation, delete the second image data and/or the third image data; or after the first image data is displayed in the display interface, delete the second image data and/or the third image data.

For technical effects implemented in any one of the second aspect and the possible designs of the second aspect, refer to the technical effect implemented in any one of the first aspect and the possible designs of the first aspect. Details are not described herein again.

According to a third aspect, an embodiment of this application further provides a circuit system. The circuit system may be one or more chips, for example, a system-on-a-chip (SoC). The circuit system includes at least one processing circuit, configured to: obtain first image data of a line-of-sight object captured by an optical camera, and obtain second image data of a non-line-of-sight object captured by an electromagnetic sensor; and fuse the first image data and the second image data to generate third image data, where the third image data is imaging data of the non-line-of-sight object obtained by fusing the first image data and the second image data, and the third image data includes position information between the non-line-of-sight object and the line-of-sight object.

In a possible design, the at least one processing circuit is specifically configured to: perform N times of feature information extraction on the second image data to obtain N pieces of first feature information, where N is an integer greater than or equal to 1; and/or perform M times of feature information extraction on the third image data to obtain M pieces of second feature information, where M is an integer greater than or equal to 1; and fuse the second image data and the third image data based on first reference information of the second image data, second reference information of the third image data, and the N pieces of first feature information and/or the M pieces of second feature information, to obtain the first image data, where the position information includes the N pieces of first feature information and/or the M pieces of second feature information, and the first reference information and the second reference information indicate a relative position relationship between the non-line-of-sight object and the line-of-sight object.

In a possible design, the first feature information includes the first reference information, the second feature information includes the second reference information, and the position information includes the first reference information and/or the second reference information.

In a possible design, the at least one processing circuit is further configured to: determine to photograph the non-line-of-sight object from a plurality of angles of view, trigger the optical camera to capture the second image data, and trigger the electromagnetic sensor to capture the third image data.

In a possible design, the at least one processing circuit is specifically configured to: if it is determined that a movement path of an electronic device within preset duration is greater than a first preset threshold, determine to photograph the non-line-of-sight object from the plurality of angles of view; or if it is determined that a rotation angle of an electronic device within preset duration is greater than a second preset threshold, determine to photograph the non-line-of-sight object from the plurality of angles of view.

For technical effects implemented in any one of the third aspect and the possible designs of the third aspect, refer to the technical effect implemented in any one of the first aspect and the possible designs of the first aspect. Details are not described herein again.

According to a fourth aspect, an embodiment of this application further provides an electronic device, where the electronic device includes a display, an optical camera, an electromagnetic sensor, one or more processors, a memory, and one or more programs. The one or more programs are stored in the memory. The one or more programs include instructions. When the instructions are executed by the electronic device, the electronic device is enabled to perform the steps of the method according to any one of the first aspect.

According to a fifth aspect, an embodiment of this application further provides an electronic device. The electronic device may include modules/units that perform the method in any one of the first aspect or the possible designs of the first aspect. The modules/units may be implemented by hardware, or may be implemented by hardware executing corresponding software.

According to a sixth aspect, an embodiment of this application further provides a chip. The chip is coupled to a memory in an electronic device. Therefore, when the chip runs, a program instruction stored in the memory is invoked to implement the method in any one of the first aspect and the possible designs of the first aspect in embodiments of this application.

According to a seventh aspect, an embodiment of this application further provides a computer-readable storage medium. The computer-readable storage medium stores a program. When the program is run on an electronic device, the electronic device is enabled to perform the method in any one of the first aspect or the possible designs of the first aspect.

According to an eighth aspect, an embodiment of this application further provides a program product. When the program product runs on an electronic device, the electronic device is enabled to perform the method in any one of the first aspect or the possible designs of the first aspect.

According to a ninth aspect, an embodiment of this application further provides a user graphical interface on an electronic device. The electronic device has a display, a camera, a memory, and one or more processors. The one or more processors are configured to execute one or more computer programs stored in the memory. The graphical user interface includes a user graphical interface displayed when the electronic device performs the method in any one of the first aspect or the possible designs of the first aspect.

For technical effects implemented in any one of the fourth aspect to the ninth aspect, refer to the technical effect implemented in any one of the first aspect and the possible designs of the first aspect. Details are not described herein again.

DETAILED DESCRIPTION OF ILLUSTRATIVE EMBODIMENTS

Figure 1:
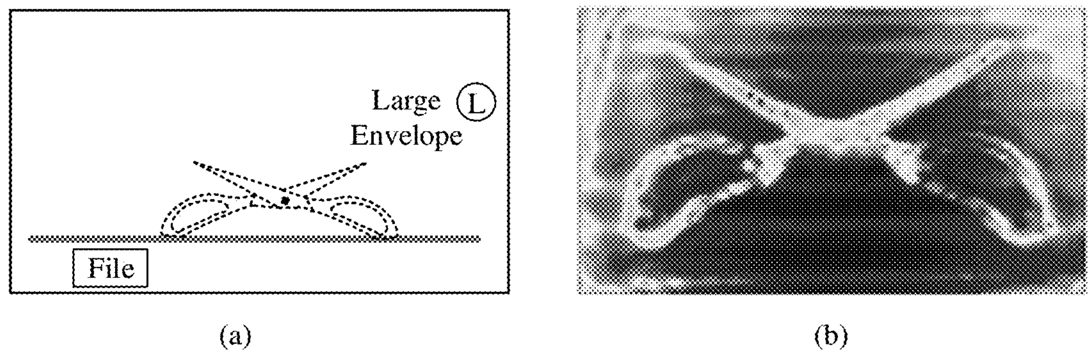
FIG. 1 is a schematic diagram of electromagnetic wave imaging in the conventional technology.

The following clearly describes the technical solutions in embodiments of the present disclosure with reference to the accompanying drawings in embodiments of the present disclosure. It is clear that the described embodiments are merely some but not all of embodiments of the present disclosure. All other embodiments obtained by a person of ordinary skill in the art based on the embodiments of the present disclosure without creative efforts shall fall within the protection scope of the present disclosure.

Optical imaging is imaging of a to-be-imaged object by using an optical element based on rules such as linear propagation of light, refraction of light, reflection of light, and selective absorption of light. However, because an optical frequency band is high, some to-be-imaged objects cannot be penetrated. In other words, imaging such as an internal structure of the to-be-imaged object cannot be implemented. Relatively speaking, because an electromagnetic wave frequency band is lower than an optical frequency band, an electromagnetic wave may penetrate a part of the to-be-imaged object. In other words, perspective of the internal structure of the to-be-imaged object is implemented. Therefore, electromagnetic wave imaging is usually used to detect the internal structure of an object or detect a non-line-of-sight object, and image the object. This may be widely applied to technical fields such as medicine and security check. It should be understood that the non-line-of-sight object herein refers to an object that is invisible to naked eyes or an object that is invisible to visible light, for example, an object blocked by an obstacle, for example, a wire hidden in a wall.

Electromagnetic wave imaging is an imaging means using the electromagnetic wave as an information carrier, and is mainly used to reconstruct a shape, a feature, or a dielectric constant distribution of the to-be-imaged object by actively or passively detecting a signal of the to-be-imaged object and a surrounding scattering field, to form an image. Electromagnetic wave imaging mainly includes two electromagnetic imaging manners: active electromagnetic imaging and passive electromagnetic imaging.

(1) Active electromagnetic imaging refers to that a transmitter in an imaging apparatus actively sends an electromagnetic wave to a to-be-imaged object, the to-be-imaged object reflects the received electromagnetic wave, and the reflected electromagnetic wave is received by a receiver in the imaging apparatus. In this specification, the transmitted electromagnetic wave is also referred to as an echo signal. The imaging apparatus processes a received echo signal, for example, extracts, from the echo signal, a target feature that represents the to-be-imaged object, for example, a feature that represents a contour of the to-be-imaged object, and images the to-be-imaged object based on the target feature.

(2) Passive electromagnetic imaging refers to that an imaging apparatus obtains, through, for example, a receive antenna, electromagnetic radiation information in space in which a to-be-imaged object is located, and performs imaging by using a difference between electromagnetic radiation intensities of different objects. For example, a typical passive electromagnetic imaging method is thermal imaging in an infrared band. Specifically, for example, radiation energy from the to-be-imaged object may be collected. The collected radiation energy is converted into an electrical signal. The electrical signal is processed. For example, development, fixation, and correction are performed on the electrical signal. Finally, the processed signal is output, for example, output to a scanning imager, a television picture tube, a cathode-ray tube, and the like, to implement imaging of the to-be-imaged object.

In electromagnetic wave imaging, a size of an antenna aperture is proportional to imaging resolution, that is, $\rho \propto D$ is met, where $\rho$ is the imaging resolution, and D is the antenna aperture. Generally, an antenna exists in a form of an array. In other words, a plurality of antennas form an antenna array in an array manner, and each antenna may also be considered as an antenna array element. A linear antenna array is used as an example. Assuming that a wavelength of an electromagnetic wave is $\lambda$, the antenna array includes N antennas, and a center of each of the N antennas is arranged at an equal interval of $\lambda/2$, the antenna aperture D is equal to $N*\lambda/2$. Limited by space, a small quantity of antenna array elements may be installed in a handheld device such as a mobile phone. Therefore, the imaging resolution of electromagnetic imaging is low, that is, imaging performance is poor.

In addition, electromagnetic imaging can implement imaging of the non-line-of-sight object, but it is more difficult to perform electromagnetic imaging on some materials. As shown in (a) in FIG. 1, there are a pair of scissors in a paper bag. It should be understood that the scissors in the paper bag are non-line-of-sight objects, that is, an object that is blocked by another object and is invisible to the naked eye. Relatively speaking, the paper bags is a line-of-sight (LOS) object. (b) in FIG. 1 is an electromagnetic wave imaging result of (a) in FIG. 1. It can be seen from (b) in FIG. 1 that an image of the scissors can be basically seen, but imaging effect of the paper bag is poor, that is, the paper bag cannot be seen. In this way, a position of the scissors in the paper bag cannot be located. It can be learned that a current electromagnetic imaging manner has a technical disadvantage that a position of the non-line-of-sight object cannot be located.

In view of this, embodiments of this application provide an imaging method for the non-line-of-sight object. According to the method, detection and imaging of any non-line-of-sight object can be implemented, and can better locate the position of the non-line-of-sight object in imaging space.

Embodiments of this application may be applied to any electronic device having an electromagnetic imaging function, to perform the imaging method for the non-line-of-sight object provided in embodiments of this application. The following describes a possible electronic device provided in an embodiment of this application and an embodiment of imaging a non-line-of-sight object by using the electronic device.

In some embodiments of this application, the electronic device may be a terminal, such as a mobile phone, a tablet computer, a mobile computer, or an in-vehicle device. The electronic device may detect the non-line-of-sight object, and detect the non-line-of-sight object by using an electromagnetic wave. From this perspective, the electronic device includes at least an antenna array, configured to transmit and receives electromagnetic wave signals to detect the non-line-of-sight object. Because the electronic device includes an antenna used for communication, for ease of distinguishing, the antenna array used to detect the non-line-of-sight object is referred to as an electromagnetic sensor. It should be understood that the electromagnetic sensor may be integrated with the antenna used for communication in the electronic device, or may be independent of the antenna used for communication in the electronic device. This is not limited in embodiments of this application. In addition, the electronic device may further implement imaging of a line-of-sight object. Therefore, the electronic device should further include a component such as an optical camera, which is also referred to as an optical sensor. It should be understood that the optical sensor may include the optical camera and a component such as a mechanical transmission apparatus. For ease of description, an example in which the optical sensor is the optical camera is used below. It should be noted that in this specification, in addition to the antenna array, the electromagnetic sensor may further include a component such as a processing chip. The electronic device may include a portable electronic device. Example embodiments of the portable electronic device include but are not limited to a portable electronic device that carries iOS®, Android®, Microsoft®, or another operating system such as Linux®. It should be understood that the portable electronic device may also be another portable electronic device, for example, a digital camera, a personal digital assistant (PDA), a media player, a smart television, a smart wearable device (such as a smartwatch, smart glasses, and a smart band), an e-reader, a handheld game console, a point of sales (POS), a vehicle-mounted electronic device (vehicle-mounted computer), or the like. It should be further understood that in some other embodiments of this application, the electronic device may not be a portable electronic device, but may be any device that includes at least an electromagnetic sensor and an optical camera, for example, a desktop computer or a mobile robot.

Generally, the electronic device may support a plurality of applications, for example, one or more of the following applications: a camera application, an instant messaging application, and a photo management application. There may be a plurality of instant messaging applications, for example, WECHAT, TENCENT chat software (QQ), WHATSAPP MESSENGER, Line, INSTAGRAM, KAKAOTALK, and DINGTALK. A user may send information such as text, voice, a picture, a video file, and various other files to another contact by using an instant message transceiver application, or the user may implement a video or audio call with another contact by using an instant message transceiver application.

The following describes, by using an example in which the electronic device is a mobile phone, a schematic diagram of a structure of the electronic device to which an embodiment of this application is applied.

Figure 2:
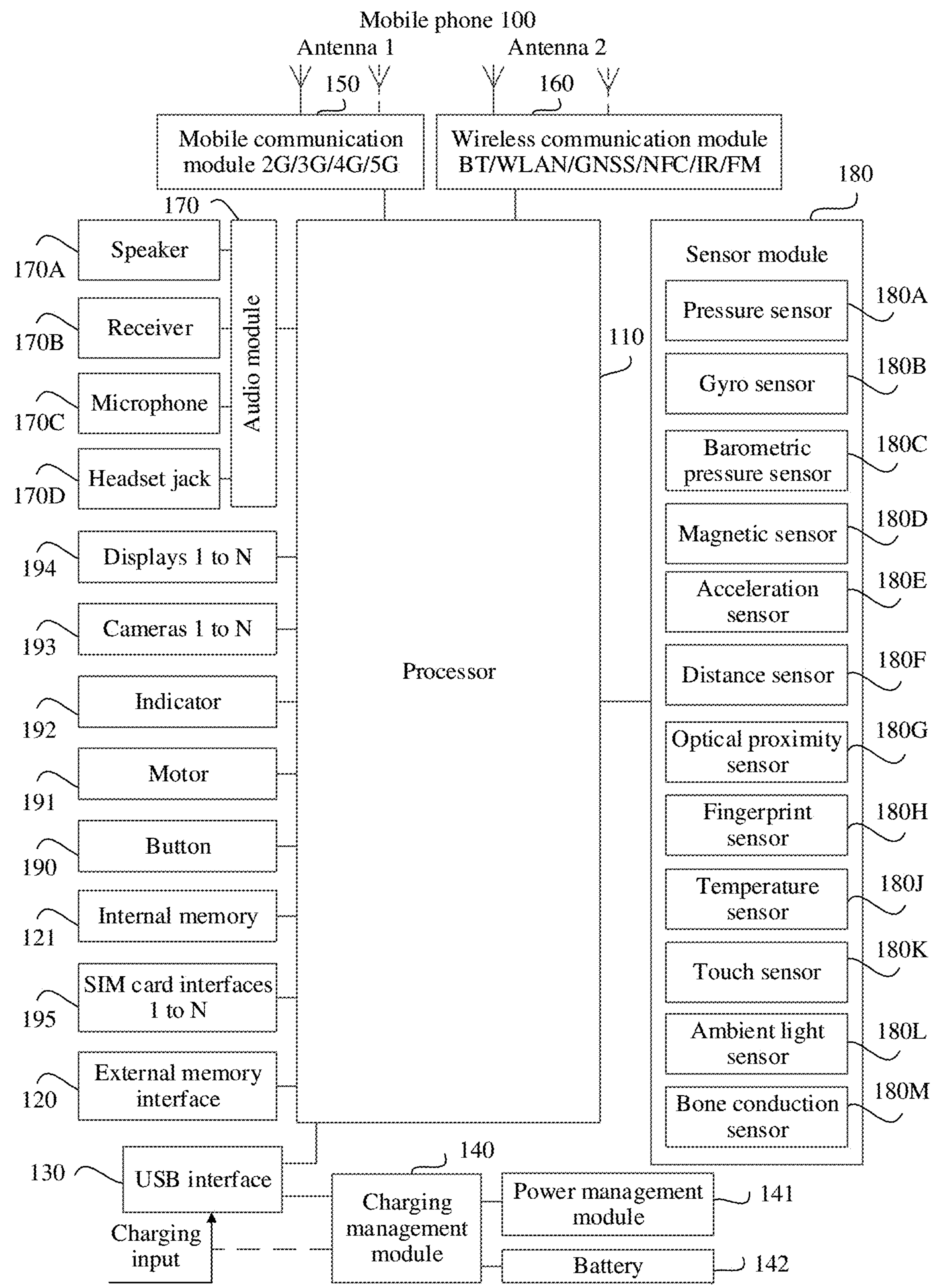
FIG. 2 is another schematic diagram of electromagnetic wave imaging in the conventional technology.

FIG. 2 is a schematic diagram of a structure of a mobile phone 100. The mobile phone 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an illustrated structure in the embodiments of the present disclosure does not constitute a specific limitation on the mobile phone 100. In other embodiments of this application, the mobile phone 100 may include more or fewer components than those shown in the figure, or combine some components, or split some components, or have a different component arrangement. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the mobile phone 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store an instruction or data that has been used or cyclically used by the processor 110. If the processor 110 is to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be configured to perform the audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through the Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the mobile phone 100. The processor 110 communicates with the display 194 through the DSI interface, to implement a display function of the mobile phone 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that complies with a USB standard specification, and may be specifically a mini USB interface, a micro USB interface, a USB Type-C interface, or the like. The USB interface 130 may be configured to connect to a charger to charge the mobile phone 100, or may be configured to transmit data between the mobile phone 100 and a peripheral device, or may be configured to connect to a headset, to play audio by using the headset. The interface may be further configured to connect to another electronic device such as an AR device.

It may be understood that an interface connection relationship between the modules shown in this embodiment of the present disclosure is merely an example for description, and does not constitute a limitation on the structure of the mobile phone 100. In some other embodiments of this application, the mobile phone 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input by using a wireless charging coil of the mobile phone 100. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communication module 160, and the like. The power management module 141 may be configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the mobile phone 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile phone 100 may be configured to cover one or more communication frequency bands. Different antennas may be further multiplexed, to improve antenna utilization. For example, the antenna 1 may be multiplexed as a diversity antenna of a wireless local area network. In some other embodiments, an antenna may be used in combination with a tuning switch. It should be understood that both the antenna 1 and the antenna 2 may be an antenna array, that is, an antenna array including a plurality of antennas. The antenna array may be a linear array, a planar array, or a distributed array.

The mobile communication module 150 may provide a solution to wireless communication that includes 2G/3G/

4G/5G or the like and that is applied to the mobile phone 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some function modules in the mobile communication module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another function module.

The wireless communication module 160 may provide a solution to wireless communication that is applied to the mobile phone 100 and that includes a wireless local area network (WLAN) (for example, a wireless fidelity (Wi-Fi) network), BLUETOOTH (BT), a global navigation satellite system (GNSS), frequency modulation (FM), a near field communication (NFC) technology, an infrared (IR) technology, or the like. The wireless communication module 160 may be one or more components integrating at least one communication processing module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communication module 150 of the mobile phone 100 are coupled, and the antenna 2 and the wireless communication module 160 of the mobile phone 100 are coupled, so that the mobile phone 100 can communicate with a network and another device by using a wireless communication technology. The wireless communication technology may include a global system for mobile communication (GSM), a general packet radio service (GPRS), code division multiple access (CDMA), wideband CDMA (WCDMA), time-division CDMA (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BEIDOU navigation satellite system (BDS), a quasi-zenith satellite system (QZSS), and/or a satellite based augmentation system (SBAS).

The mobile phone 100 may implement an audio function such as music playing or recording through the audio module 170, the loudspeaker 170A, the telephone receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker," is configured to convert an audio electrical signal into a sound signal. The mobile phone 100 may listen to music or answer a hands-free call through the speaker 170A.

The receiver 170B, also referred to as an "earpiece," is configured to convert an audio electrical signal into a sound signal. When a call is answered or voice information is received by using the mobile phone 100, the receiver 170B may be put close to a human ear to listen to a voice.

The microphone 170C, also referred to as "mike" or "mic," is configured to convert a sound signal into an electrical signal. When making a call or sending a voice message, the user may make a sound near the microphone 170C through the mouth, to enter a sound signal to the microphone 170C. At least one microphone 170C may be disposed in the mobile phone 100. In some other embodiments, two microphones 170C may be disposed in the mobile phone 100, to capture a sound signal and further implement a noise reduction function. In some other embodiments, three, four, or more microphones 170C may alternatively be disposed in the mobile phone 100, to capture a sound signal, reduce noise, further identify a sound source, implement a directional recording function, and the like.

The headset jack 170D is configured to connect to a wired headset. The headset jack 170D may be the USB interface 130 or a 3.5 mm open mobile terminal platform (OMTP) standard interface or a cellular telecommunication industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The mobile phone 100 determines pressure intensity based on a capacitance change. When a touch operation is performed on the display 194, the mobile phone 100 detects intensity of the touch operation by using the pressure sensor 180A. The mobile phone 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a motion posture of the mobile phone 100. In some embodiments, the gyroscope sensor 180B may be used to determine angular velocities of the mobile phone 100 around three axes (namely, x, y, and z axes). The gyroscope sensor 180B may be configured to implement image stabilization during photographing. For example, when a shutter is pressed, the gyro sensor 180B detects an angle at which the mobile phone 100 jitters, obtains, through calculation based on the angle, a distance for which a lens module is to compensate, and allows a lens to cancel the jitter of the mobile phone 100 through reverse motion, to implement image stabilization. The gyro sensor 180B may also be used in a navigation scenario and a somatic game scenario.

The barometric pressure sensor 180C is configured to measure barometric pressure. In some embodiments, the mobile phone 100 calculates an altitude based on a value of the atmospheric pressure measured by the barometric pressure sensor 180C, to assist positioning and navigation.

The magnetic sensor 180D includes a Hall sensor. The mobile phone 100 may detect opening and closing of a flip leather cover by using the magnetic sensor 180D. In some embodiments, when the mobile phone 100 is a clamshell phone, the mobile phone 100 may detect opening and closing of a clamshell by using the magnetic sensor 180D. Further, a feature such as automatic unlocking of the flip cover is set based on a detected opening or closing state of the leather case or a detected opening or closing state of the flip cover.

The acceleration sensor 180E may detect an amount of acceleration of the mobile phone 100 in various directions (usually on three axes). When the mobile phone 100 is static, a value and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The mobile phone 100 may measure a distance through infrared or laser. In some embodiments, in a photographing scenario, the mobile phone 100 may measure a distance by using the distance sensor 180F, to implement quick focusing.

The optical proximity sensor 180G may include, for example, a light-emitting diode (LED) and an optical detector such as a photodiode. The light emitting diode may be an infrared light emitting diode. The mobile phone 100 may emit infrared light by using the light emitting diode. The mobile phone 100 detects reflected infrared light of a nearby object by using the photodiode. When sufficient reflected light is detected, it may be determined that there is an object near the mobile phone 100. When insufficient reflected light is detected, the mobile phone 100 may determine that there is no object near the mobile phone 100. The mobile phone 100 may detect, by using the optical proximity sensor 180G, that the user puts the mobile phone 100 close to an ear for conversation, so that automatic screen-off is implemented to save power. The optical proximity sensor 180G may also be used in a smart cover mode or a pocket mode to automatically perform screen unlocking or locking.

The ambient light sensor 180L is configured to sense ambient light brightness. The mobile phone 100 may adaptively adjust luminance of the display 194 based on the sensed luminance of the ambient light. The ambient light sensor 180L may also be configured to automatically adjust white balance during photographing. The ambient light sensor 180L may further cooperate with the optical proximity sensor 180G to detect whether the mobile phone 100 is in a pocket, thereby preventing an accidental touch.

The fingerprint sensor 180H is configured to collect a fingerprint. The mobile phone 100 may implement fingerprint unlock, application lock access, fingerprint photographing, fingerprint-based call answering, and the like by using a feature of the collected fingerprint.

The temperature sensor 180J is configured to detect a temperature. In some embodiments, the mobile phone 100 executes a temperature processing policy by using the temperature detected by the temperature sensor 180J. For example, when the temperature reported by the temperature sensor 180J exceeds a threshold, the mobile phone 100 reduces performance of a processor near the temperature sensor 180J, to reduce power consumption and implement heat protection. In some other embodiments, when the temperature is lower than another threshold, the mobile phone 100 heats the battery 142, to avoid an abnormal shutdown of the mobile phone 100 caused by the low temperature. In some other embodiments, when the temperature is lower than still another threshold, the mobile phone 100 boosts an output voltage of the battery 142, to avoid an abnormal shutdown caused by the low temperature.

The touch sensor 180K is also referred to as a touch panel. The touch sensor 180K may be disposed on the display 194, and the touch sensor 180K and the display 194 constitute a touchscreen. The touch sensor 180K is configured to detect a touch operation performed on or near the touch sensor 180K. The touch sensor may transfer the detected touch operation to the application processor to determine a type of the touch event. A visual output related to the touch operation may be provided through the display 194. In some other embodiments, the touch sensor 180K may be alternatively disposed on a surface of the mobile phone 100, and is located on a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The mobile phone 100 may receive a button input, and generate a button signal input related to a user setting and function control of the mobile phone 100.

The motor 191 may generate a vibration prompt. The motor 191 may be configured to provide an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the mobile phone 100. The mobile phone 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may also be compatible with an external memory card. The mobile phone 100 interacts with a network by using the SIM card, to implement functions such as calling and data communication. In some embodiments, the mobile phone 100 uses an eSIM, namely, an embedded SIM card. The eSIM card may be embedded in the mobile phone 100, and cannot be separated from the mobile phone 100.

The mobile phone 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute an instruction to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the mobile phone 100 may include one or N displays 194. Herein, N is a positive integer greater than 1.

The mobile phone 100 may implement a photographing function by using the ISP, the camera 193, the video codec, the GPU, the display 194, the application processor, and the like.

The ISP may be configured to process the image data captured by the camera 193. For example, during photographing, a shutter is pressed, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. In this embodiment of this application, the camera 193 includes an optical camera and an electromagnetic sensor. An object generates an optical image by using the lens of the optical camera and projects the optical image to the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV.

The electromagnetic sensor is configured to perform imaging on a non-line-of-sight object in an active electromagnetic imaging manner or a passive electromagnetic imaging manner. For example, the electromagnetic sensor sends an electromagnetic wave to the to-be-imaged object through a transmitter, receives an echo signal from the to-be-imaged object through a receiver, converts the echo signal into an electrical signal, and then transmits the electrical signal to the ISP to convert the electrical signal into a digital image signal. The ISP outputs the digital image signal to the DSP for processing, for example, extracts a target feature of the to-be-imaged object, and finally converts the digital image signal into an image signal. For another example, the electromagnetic sensor collects radiation energy of the to-be-imaged object, converts the collected radiation energy into an electrical signal, and then transmits the electrical signal to the ISP to convert the electrical signal into a digital image signal. The ISP outputs the digital image signal to the DSP for processing, for example, extracts a target feature of the to-be-imaged object, and finally converts the digital image signal into an image signal.

The digital signal processor is configured to process a digital signal, and may process another digital signal in addition to the digital image signal. For example, when the mobile phone 100 selects a frequency, the digital signal processor is configured to perform Fourier transform on frequency energy, and the like.

The video codec is configured to compress or decompress a digital video. The mobile phone 100 may support one or more video codecs. In this way, the mobile phone 100 may play or record videos in a plurality of encoding formats, for example, moving picture experts group (MPEG)1, MPEG2, MPEG3, and MPEG4.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the mobile phone 100 may be implemented by using the NPU, for example, image recognition, facial recognition, speech recognition, and text understanding.

The external memory interface 120 may be configured to connect to an external storage card, for example, a Micro SD card, to extend a storage capability of the mobile phone 100. The external memory card communicates with the processor 110 through the external memory interface 120, to implement a data storage function. For example, data such as music, a photo, and a video is stored in the external memory card.

The internal memory 121 may be configured to store computer-executable program code. The executable program code includes instructions. The processor 110 runs the instructions stored in the internal memory 121, to perform various function applications of the mobile phone 100 and data processing. The internal memory 121 may include a program storage area and a data storage area. The program storage area may store an operating system, an application for use by at least one function (for example, a sound playing function or an image playing function), and the like. The data storage area may store data (such as audio data and a phone book) and the like created during use of the mobile phone 100. In addition, the internal memory 121 may include a high-speed random access memory, and may further include a nonvolatile memory, for example, at least one magnetic disk storage device, a flash memory device, or a universal flash storage (UFS).

The internal memory 121 may further store software code of the non-line-of-sight object photographing method provided in this embodiment of this application. When the processor 110 runs the software code, steps of the procedure of the non-line-of-sight object photographing method are performed, so that imaging of the non-line-of-sight object can be implemented, a position of a non-line-of-sight object in space can also be located.

The internal memory 121 may further store a photographed image.

The external memory interface 120 may be configured to connect to an external storage card, for example, a Micro SD card, to extend a storage capability of the mobile phone 100. The external memory card communicates with the processor 110 through the external memory interface 120, to implement a data storage function. For example, files such as music, images, and videos are stored in the external storage card.

Certainly, software code of the photographing method for a non-line-of-sight object provided in this embodiment of this application may also be stored in the external memory. The processor 110 may run the software code by using the external memory interface 120, to perform steps of the procedure of the photographing method for the non-line-of-sight object, to implement imaging of the non-line-of-sight object. An image photographed by the mobile phone 100 may also be stored in the external memory.

It should be understood that a user may specify whether to store an image in the internal memory 121 or the external memory. For example, when the mobile phone 100 is currently connected to the external memory, if the mobile phone 100 photographs an image, prompt information may pop up to indicate to the user to determine whether to store the image in the external memory or the internal memory 121. Certainly, there is another specifying manner, and this is not limited in this embodiment of this application. Alternatively, when detecting that a memory amount of the internal memory 121 is less than a preset amount, the mobile phone 100 may automatically store an image in the external memory.

It should be understood that, in this embodiment of this application, an example in which the electronic device is the mobile phone 100 is used, but a form of the electronic device is not limited. For example, the electronic device may be an in-vehicle device, and may include a laser radar, a millimeter-wave radar, or the like. A structure shown in this embodiment of this application does not constitute any specific limitation on the mobile phone 100. In other embodiments of this application, the mobile phone 100 may include more or fewer components than those shown in the figure, or combine some components, or split some components, or have a different component arrangement. The components shown in the figure may be implemented by using hardware, software, or a combination of software and hardware.

The following uses an example in which embodiments of this application are applied to the mobile phone 100 to describe in detail the solutions provided in embodiments of this application by using several examples of a process in which the mobile phone 100 photographs and obtains an image of a non-line-of-sight object.

It should be noted that an image processing process provided in the following embodiments is applicable to an image in any format, such as an uncompressed image format or a BMP format. In other words, an image processing process such as an image fusion process in the following is applicable to an image in the BMP format. For another example, an image processing process provided in the following embodiments may be further applicable to a compressed image format, such as a JPEG format, a JPG format, a GIF format, or a PNG format. In other words, the image processing process such as the image fusion process in the following may be applicable to an image in a format such as the JPEG format, the JPG format, the GIF format, or the PNG format. For another example, for images of the compressed image format, the mobile phone 100 may decompress these images, and then perform an image processing process provided in the following embodiments on the decompressed images. It should be understood that, image fusion means performing feature extraction on images that are about a same target and that are captured from a plurality of source channels (for example, an optical camera and an electromagnetic sensor), and performing comprehensive processing on correspondingly extracted features from the source channels, for example, recombining the extracted features, to obtain an image with higher imaging quality.

A preview image in the embodiments of this application is an image displayed in a viewfinder interface of an electronic device. For example, when the electronic device is the mobile phone 100, the mobile phone 100 starts a camera application, start a camera, and displays a viewfinder interface, where a preview image is displayed in the viewfinder interface. For example, when a video call function is started on the mobile phone 100, the camera is started, and the viewfinder interface is displayed, where a preview image is displayed in the viewfinder interface.

In this embodiment of this application, the camera application of the mobile phone 100 is used as an example, but is not limited to the camera application. For example, the camera application may be another application on the mobile phone 100. For example, the application is started, and the non-line-of-sight object may be imaged by default.

Example 1: The mobile phone 100 photographs an image from a single angle of view.

Figure 3:
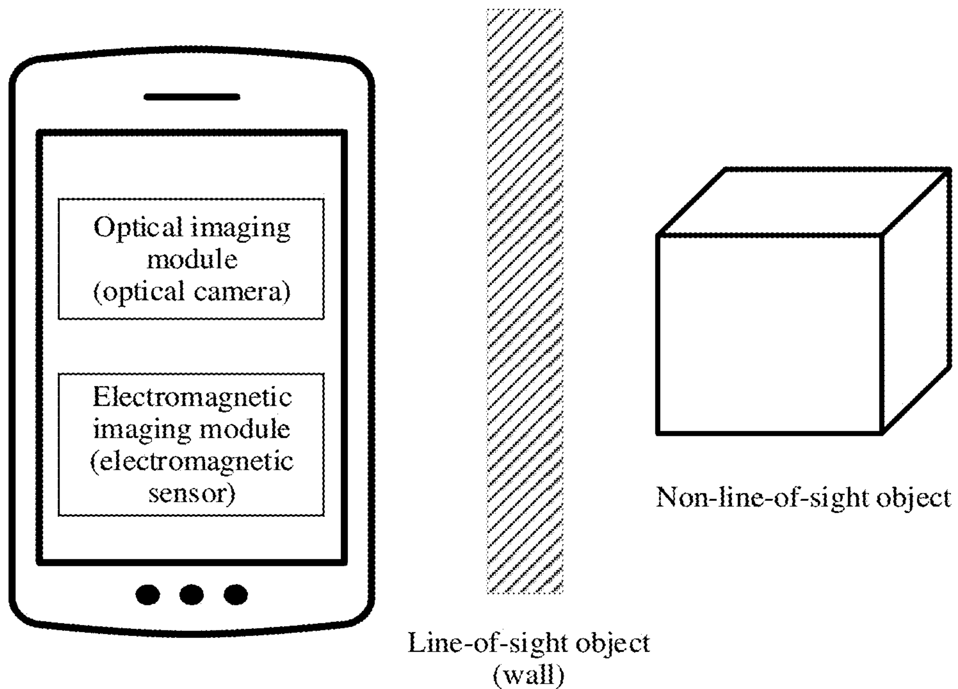
FIG. 3 is an imaging scenario of a non-line-of-sight object according to an embodiment of this application.
Figure 4:
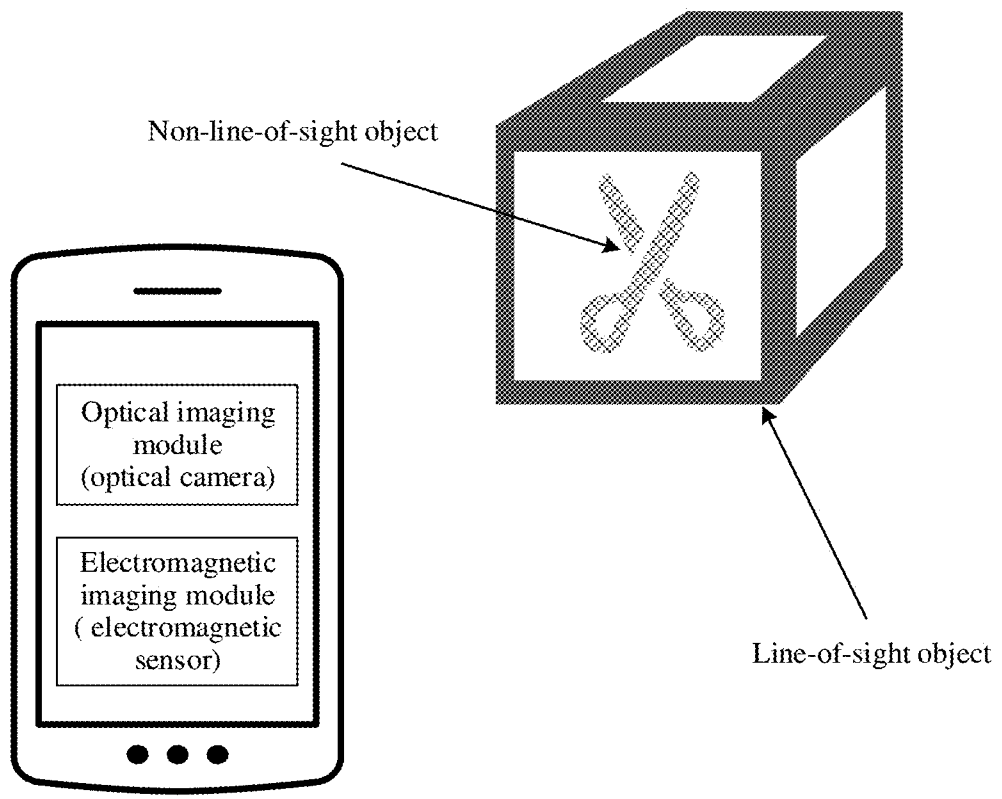
FIG. 4 is another imaging scenario of a non-line-of-sight object according to an embodiment of this application.

FIG. 3 is an example of an application scenario according to an embodiment of this application. As shown in FIG. 3, a to-be-imaged object (for example, a box) is blocked by an obstruction (a wall). In this case, the to-be-imaged object, that is, the box, may be considered as a non-line-of-sight object, and the wall is a line-of-sight object. FIG. 4 is an example of another application scenario according to an embodiment of this application. As shown in FIG. 4, a to-be-imaged object (for example, scissors) is blocked by an obstruction (a box). In this case, the to-be-imaged object, that is, the scissors, may be considered as a non-line-of-sight object, and the box is a line-of-sight object.

Figure 5:
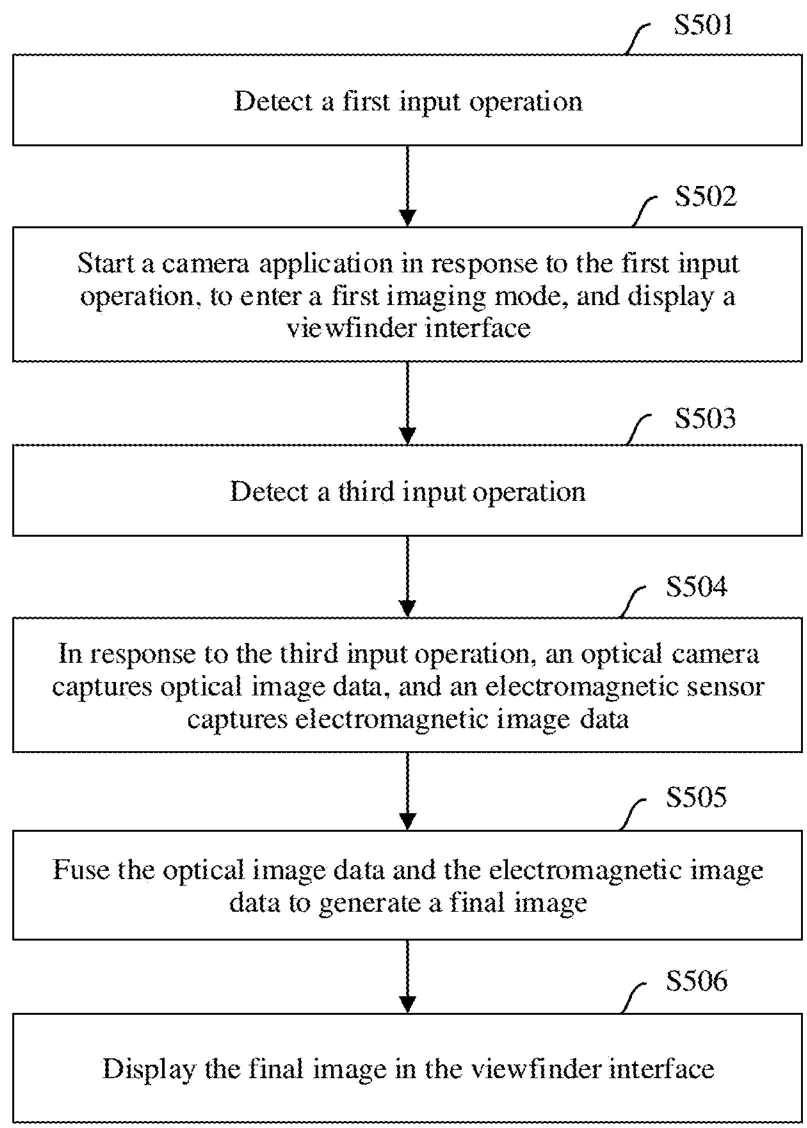
FIG. 5 is a schematic flowchart of an imaging method for a non-line-of-sight object according to an embodiment of this application.

The following uses the scenario in FIG. 4 as an example to describe a process of photographing the non-line-of-sight object by the mobile phone 100. FIG. 5 is a schematic flowchart of photographing the non-line-of-sight object by the mobile phone 100. It should be understood that the mobile phone 100 includes at least one optical camera and at least one electromagnetic sensor. As shown in FIG. 5, the photographing process includes the following steps.

S501: Detect a first input operation.

For example, the display 194 of the mobile phone 100 displays a home screen, and the home screen includes icons of application programs (for example, a camera application icon and a WECHAT application icon). A user detects an operation of the user on the display 194 through the touch sensor 180K disposed on the display 194. The first input operation may be an operation of tapping the camera application icon on the home screen. Certainly, the first input operation may alternatively be another operation, for example, an operation of sliding up on a lock screen interface or an operation of pressing and holding a volume button, provided that the first input operation can start the camera. This is not limited this embodiment of this application.

S502: Start a camera application in response to the first input operation, to enter a first imaging mode, and display a viewfinder interface.

It should be understood that starting the camera application is starting the optical camera. The mobile phone 100 provided in this embodiment of this application may photograph a visible object such as a portrait, and may also photograph the non-line-of-sight object. It should be understood that the portrait is relative to the non-line-of-sight object. In other words, the mobile phone 100 supports at least two imaging modes. It should be understood that the viewfinder interface may be considered as a display interface of the mobile phone 100, a display interface of the camera application, or the like. In this specification, the viewfinder interface is also referred to as a display interface.

Figure 6:
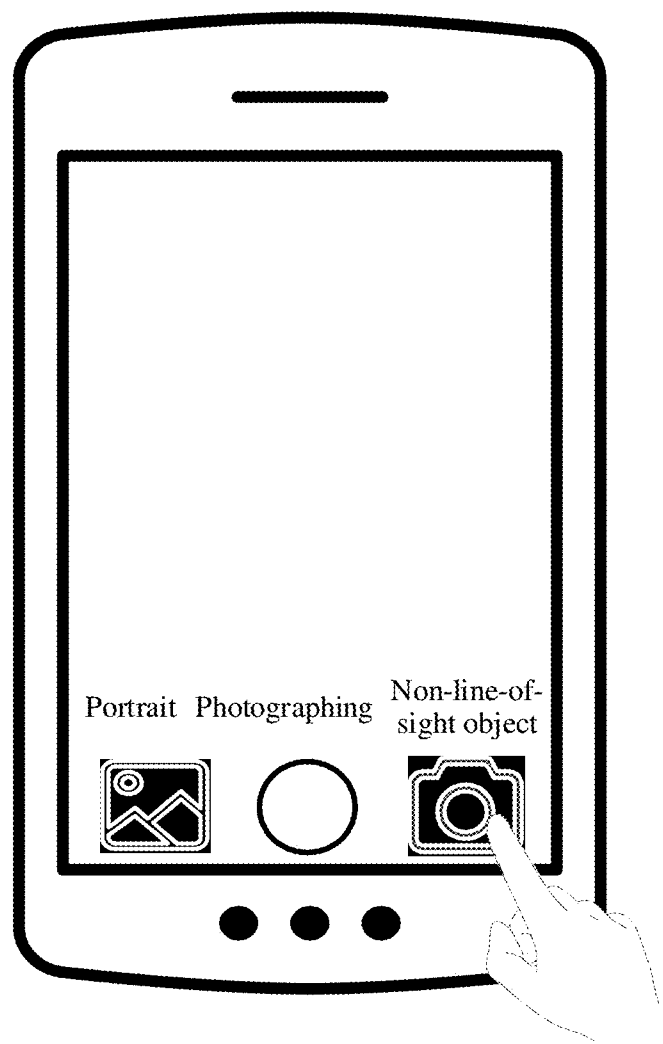
FIG. 6 is a schematic diagram of a camera interface of a mobile phone according to an embodiment of this application.

For example, FIG. 6 is a schematic diagram of a camera display interface. It can be learned from FIG. 6 that the camera display interface includes icons of a plurality of imaging modes (for example, a portrait icon, a landscape icon, and a non-line-of-sight object icon). A "portrait" imaging mode or a "landscape" imaging mode may also be understood as an optical imaging mode. Correspondingly, a "non-line-of-sight object" imaging mode may also be understood as an electromagnetic imaging mode, or the "non-line-of-sight object" imaging mode may also be understood as a combination of the electromagnetic imaging mode and the optical imaging mode. It should be understood that, in this embodiment of this application, the portrait icon, the landscape icon, and the non-line-of-sight object icon are merely used as examples for distinguishing optical imaging from electromagnetic imaging. The first imaging mode may be the optical imaging mode, or may be the electromagnetic imaging mode.

The user detects a second input operation of the user on the display 194 through the touch sensor 180K disposed on the display 194. The second input operation may be an operation of tapping the portrait icon in the camera display interface or an operation of tapping the non-line-of-sight object icon in the camera display interface. Certainly, the second input operation may alternatively be another operation, for example, an operation of sliding up in the camera display interface or an operation of pressing and holding the volume button, provided that the second input operation can enter the first imaging mode. This is not limited in this embodiment of this application.

For another example, the camera display interface includes an imaging mode option control. When detecting an operation on the control, the mobile phone 100 displays a selection box including a plurality of imaging modes, including a "portrait" option, a "non-line-of-sight object" option, and the like. When detecting an operation on the "portrait" option or the "non-line-of-sight object" option, the mobile phone 100 enters the first imaging mode. For ease of description, the following uses an example in which the first imaging mode is an imaging mode of a "non-line-of-sight object," that is, the electromagnetic imaging mode.

It should be understood that the optical camera may be started in both the portrait imaging mode and the non-line-of-sight object imaging mode. In some embodiments, the mobile phone 100 starts the camera application and the optical camera in response to the first input operation. However, if the first imaging mode is the "non-line-of-sight object" imaging mode, the mobile phone 100 further starts the electromagnetic sensor. In some embodiments, the mobile phone 100 detects the first input operation, for example, the operation of tapping the camera application icon on the home screen, to start the optical camera, and then detects the second input operation, for example, the operation of tapping the non-line-of-sight object icon on the camera display screen, to start the electromagnetic sensor. Otherwise, the mobile phone 100 does not start the electromagnetic sensor, to save energy consumption of the mobile phone 100 as much as possible. Certainly, in some other embodiments, the mobile phone 100 detects the first input operation, for example, the operation of tapping the camera application icon on the home screen, to start the optical camera and the electromagnetic sensor. It should be noted that, if the electromagnetic sensor is integrated with an antenna used by the electronic device for communication, the electromagnetic sensor is always started by default.

The foregoing lists two manners in which a user manually sets the mobile phone 100 to enter the first imaging mode. In actual application, the mobile phone 100 may further enter the first imaging mode in another manual manner. For example, the camera display interface includes a preview image, and the preview image includes an optical image and a fused image of the optical image and an electromagnetic image. The user may manually select the fused image of the optical image and the electromagnetic image, that is, perform an operation on the fused image. If the user performs the operation on the fused image, it may be considered that the user manually chooses to enter the first imaging mode. These are not enumerated in this embodiment of this application.

The mobile phone 100 enters the first imaging mode based on the second input operation performed by the user, that is, enters the first imaging mode based on a trigger operation of the user. In an alternative implementation, the mobile phone 100 may also actively enter the first imaging mode. For example, the mobile phone 100 determines a to-be-imaged scenario. In other words, when a photographing scenario is a macro scenario, the mobile phone 100 enters the first imaging mode.

For example, the mobile phone 100 starts the camera application in response to the first input operation, opens for example, the optical camera, and displays the viewfinder interface. It should be understood that the viewfinder interface may display the optical image. The mobile phone 100 may recognize the optical image by using an existing image recognition algorithm, to determine the to-be-imaged scenario, for example, a portrait scenario, a landscape scenario, or a macro scenario, and then enters a corresponding imaging mode based on the recognized to-be-imaged scenario. For example, if the mobile phone 100 determines that the to-be-imaged scenario is the portrait scenario, the mobile phone 100 automatically enters the portrait imaging mode. For another example, if the mobile phone 100 determines that the to-be-imaged scenario is the landscape scenario, the mobile phone 100 automatically enters the landscape imaging mode. It should be noted that the macro scenario means that within preset duration, the mobile phone 100 is close to a to-be-imaged object. For example, a distance between the mobile phone 100 and the to-be-imaged object is less than a preset threshold. If the to-be-imaged scenario is the macro scenario, it may be considered that a non-line-of-sight object is to be imaged. For example, if the mobile phone 100 detects that the mobile phone 100 keeps facing the to-be-imaged object within the preset duration, that is, the to-be-imaged object is located within a range of a photographing angle of view of the optical camera, and a distance between the to-be-imaged object and the mobile phone 100 is short, the mobile phone 100 considers the to-be-imaged scenario as the macro scenario, and automatically enters the first imaging mode. The user might not need to manually select the first imaging mode. This is intelligent.

For still another example, in the foregoing example, if the mobile phone 100 identifies that the to-be-imaged scenario is the macro scenario, the mobile phone 100 may further output prompt information. The prompt information prompts the user whether to enter the non-line-of-sight object imaging mode, to prevent entering the first imaging mode from being mistakenly triggered when the to-be-imaged scenario is incorrectly identified. This better meets an actual specification of the user.

S503: Detect a third input operation.

After entering the first imaging mode, the mobile phone 100 displays a viewfinder picture. The to-be-imaged object may not be in the viewfinder picture. Therefore, the user may adjust a relative position of the mobile phone 100 relative to the to-be-imaged object, so that the to-be-imaged object is in the viewfinder picture, to ensure that the mobile phone 100 can capture an image of the to-be-imaged object.

Then, the user may trigger the mobile phone 100 to photograph the to-be-imaged object. For example, the mobile phone 100 may detect the third input operation of the user on the display 194 through the touch sensor 180K disposed on the display 194. The third input operation may be an operation of tapping a photographing icon in the camera display interface. Certainly, the third input operation may alternatively be another operation, for example, an operation of sliding up on a viewfinder display interface or an operation of pressing and holding the volume button, provided that the third input operation can be an operation of triggering photographing. This is not limited in this embodiment of this application. Alternatively, after the mobile phone 100 enters the first imaging mode, if the mobile phone 100 detects that the to-be-imaged object is located in the viewfinder picture, the mobile phone 100 may automatically trigger photographing of the to-be-imaged object.

It should be understood that, considering that a volume of the to-be-imaged object is large, an angle of view of each photographing performed by the mobile phone 100 is limited. If the mobile phone 100 performs photographing once, imaging of the non-line-of-sight object cannot be implemented. In this case, the mobile phone 100 may photograph the non-line-of-sight object for a plurality of times, and each time of photographing, a position of the mobile phone 100 relative to the non-line-of-sight object may be correspondingly adjusted. In other words, the photographing angle of view of the mobile phone 100 is adjusted, to implement imaging of the non-line-of-sight object. In some embodiments, the mobile phone 100 may determine, based on an operation of the user, to perform multi-angle photographing on the non-line-of-sight object, or the mobile phone 100 may automatically determine whether to perform multi-angle photographing on the non-line-of-sight object. Multi-angle photographing performed by the mobile phone 100 on the non-line-of-sight object may be understood as a multi-angle photographing mode, also referred to as a multi-angle mode, that is, photographing the object from the plurality of angles of view. A detailed procedure of multi-angle photographing of an object by the mobile phone 100 is subsequently described by using a specific example.

S504: In response to the third input operation, the optical camera captures optical image data, and the electromagnetic sensor captures electromagnetic image data.

It should be understood that the optical image data includes optical image data of the line-of-sight object, and the electromagnetic image data includes electromagnetic image data of the non-line-of-sight object. As shown in FIG. 4, the optical image data includes image data of a line-of-sight object "box," and the electromagnetic image data includes image data of a non-line-of-sight object "scissors." It should be noted that an example in which the optical camera captures the optical image data is used herein. In some embodiments, in response to the third input operation, the electronic device may alternatively capture image data by using a laser radar, a millimeter-wave radar, or the like disposed in the electronic device, and capture the electromagnetic image data by using the electromagnetic sensor. For ease of distinguishing, the image data captured by the laser radar, the millimeter-wave radar, and the like is referred to as radar image data.

Figure 7:
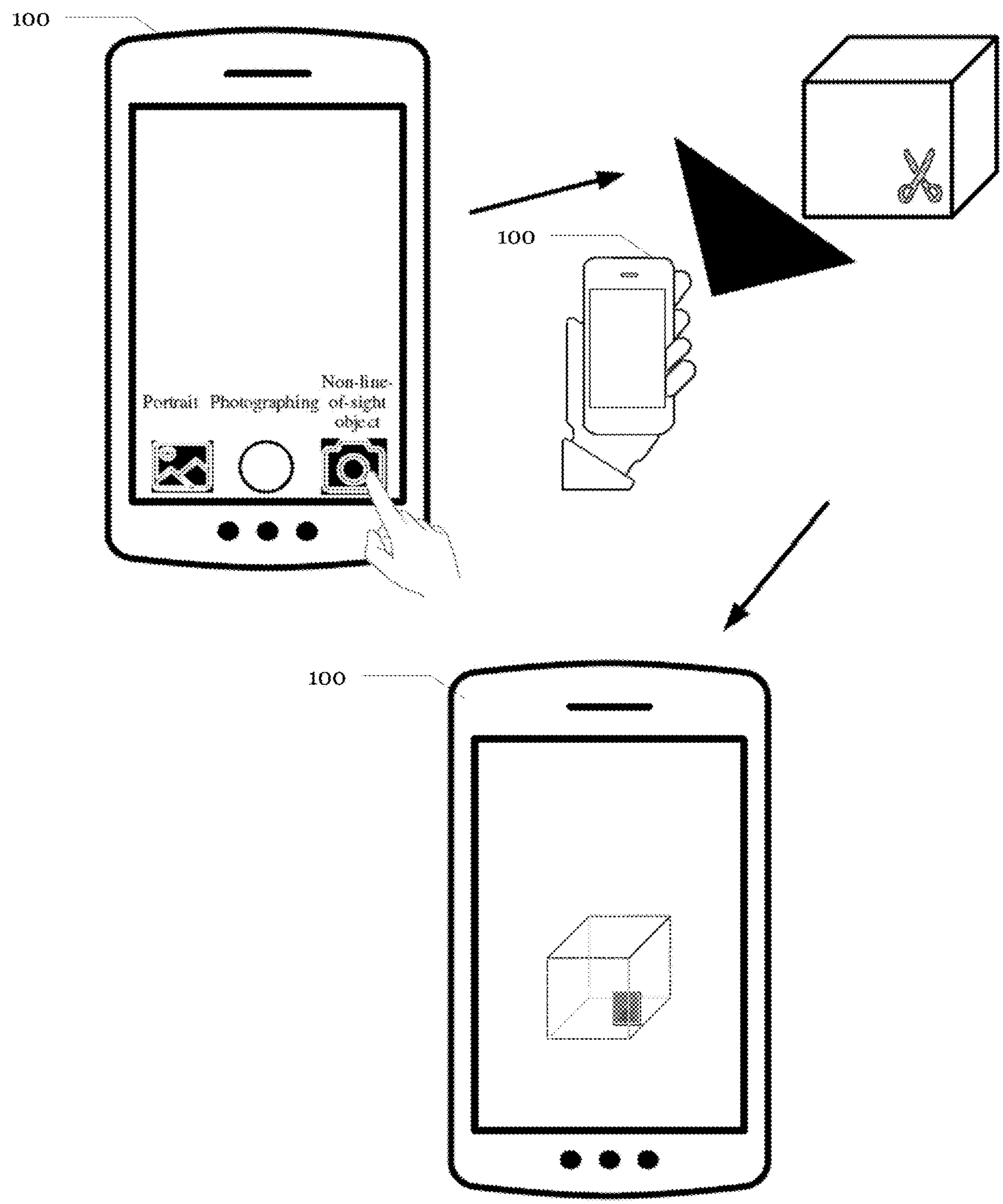
FIG. 7 is a schematic flowchart of imaging of a non-line-of-sight object according to an embodiment of this application.

If the mobile phone 100 supports active electromagnetic imaging, the mobile phone 100 emits an electromagnetic wave through an antenna, to irradiate a to-be-imaged space area (it should be understood that the line-of-sight object and the non-line-of-sight object are located in the space area), as shown in FIG. 7. The line-of-sight object and the non-line-of-sight object receive the electromagnetic wave, and reflect the received electromagnetic wave to the electromagnetic sensor. In other words, the electromagnetic sensor receives an echo signal through an antenna. Then, the electromagnetic sensor may extract radiation information of the echo signal, and perform imaging of the non-line-of-sight object based on the radiation information. It should be understood that the radiation information of the echo signal may include electromagnetic radiation information of the line-of-sight object and the non-line-of-sight object. Distribution of the line-of-sight object and the non-line-of-sight object in space, that is, distribution of position points of the line-of-sight object and the non-line-of-sight object in space, may be determined by using the electromagnetic radiation information.

If the mobile phone 100 supports passive electromagnetic imaging, the mobile phone 100 obtains radiation information in the to-be-imaged space area through the antenna, and implements imaging by using a difference between radiation intensities of different objects (the line-of-sight object and the non-line-of-sight object).

In some embodiments, the mobile phone 100 enters the first imaging mode, and may first capture the optical image data by using an optical camera, and then capture the electromagnetic image data by using the electromagnetic sensor; or may first capture the electromagnetic image data by using the electromagnetic sensor, and then obtain the optical image data by using the optical camera; or capture a corresponding image by using both the electromagnetic sensor and the optical camera. This is not limited in this embodiment of this application.

S505: Fuse the optical image data and the electromagnetic image data to generate a final image.

It should be understood that, if the electronic device captures the radar image data, the radar image data and the electromagnetic image data are fused. The following uses fusion of the optical image data and the electromagnetic image data as an example. In this embodiment of this application, there may be a plurality of image fusion manners. A possible fusion manner is, for example: The mobile phone 100 performs feature extraction on the optical image data, for example, may extract feature information such as a contour used to represent an object included in the optical image data, reconstructs the optical image based on the feature information, that is, recombine the feature information, and then feature combines the electromagnetic image data with the reconstructed optical image data based on a space position relationship, to obtain a final image. Another possible fusion manner is, for example: The mobile phone 100 performs feature extraction on the electromagnetic image data, for example, may extract feature information that is used to represent a contour of an object included in the electromagnetic image data, reconstructs the electromagnetic image based on the feature information, and then feature combines the optical image data with the reconstructed electromagnetic image based on a space position relationship, to obtain a final image. In a possible fusion manner, for example, the mobile phone 100 separately extracts feature information from the optical image data and the electromagnetic image data. It should be understood that the extracted feature information is information that helps obtain a high-quality image. Then, image reconstruction is performed based on feature information extracted from the optical image data, to obtain a new optical image, and image reconstruction is performed based on feature information extracted from the electromagnetic image data, to obtain a new electromagnetic image. Then, based on a space position relationship, feature combination is performed on the new optical image and the new electromagnetic image, to obtain a final image. It should be understood that the final image includes feature information of the extracted optical image and feature information of the extracted electromagnetic image, so that imaging quality of the final image is high.

For ease of description, in the following, the optical image data is referred to as a first image, the electromagnetic image data is referred to as a second image, an image reconstructed from the first image is referred to as a third image, and an image reconstructed from the second image is referred to as a fourth image. It should be understood that the third image may be an image from which redundant information in the first image is removed, and position information that can represent a relative position relationship between the non-line-of-sight object and the line-of-sight object is retained. For example, the third image includes information such as a contour, a pattern, or an identifier of an object in the first image, and may assist in positioning the non-line-of-sight object in imaging space. The fourth image may also be an image from which redundant information in the second image is removed, and position information that can represent a relative position relationship between the non-line-of-sight object and the line-of-sight object is retained. For example, the fourth image includes information such as a contour, a pattern, or an identifier of the non-line-of-sight object, and may assist in positioning the non-line-of-sight object in imaging space. It should be understood that a fused image of the first image and the fourth image is a final image, a fused image of the second image and the third image is a final image, and a fused image of the third image and the fourth image is also a final image.

The following describes how to fuse the first image and the second image by using a specific example.

Figure 8:
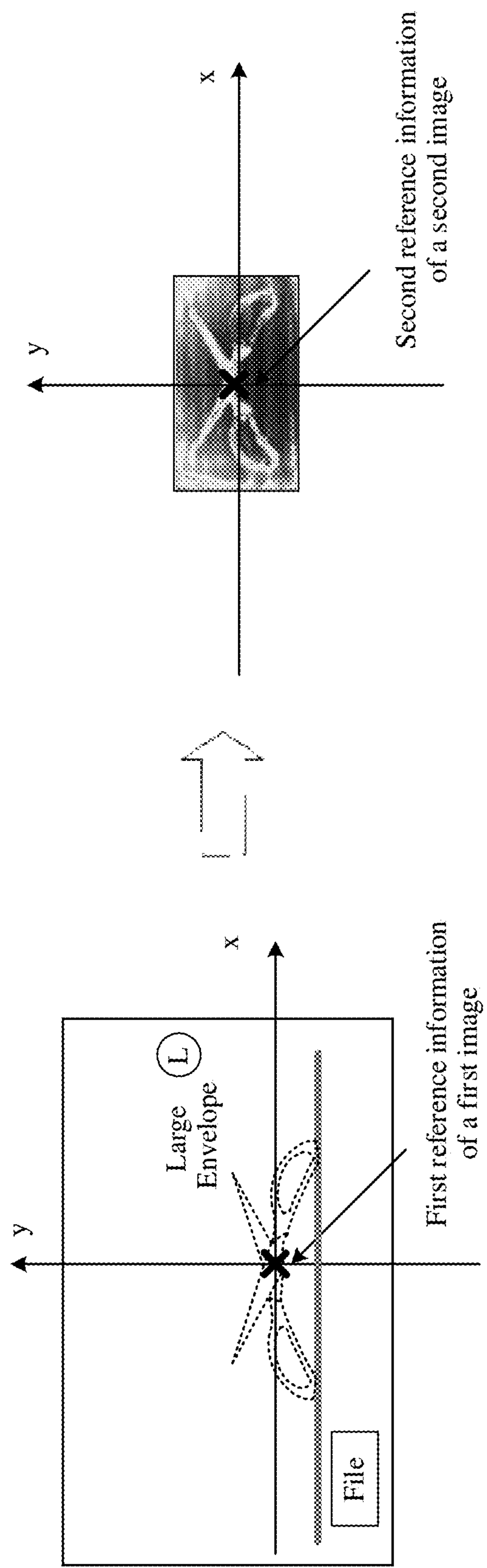
FIG. 8 is a schematic diagram of a relative position relationship between an optical image and an electromagnetic image according to an embodiment of this application.
Figure 10:
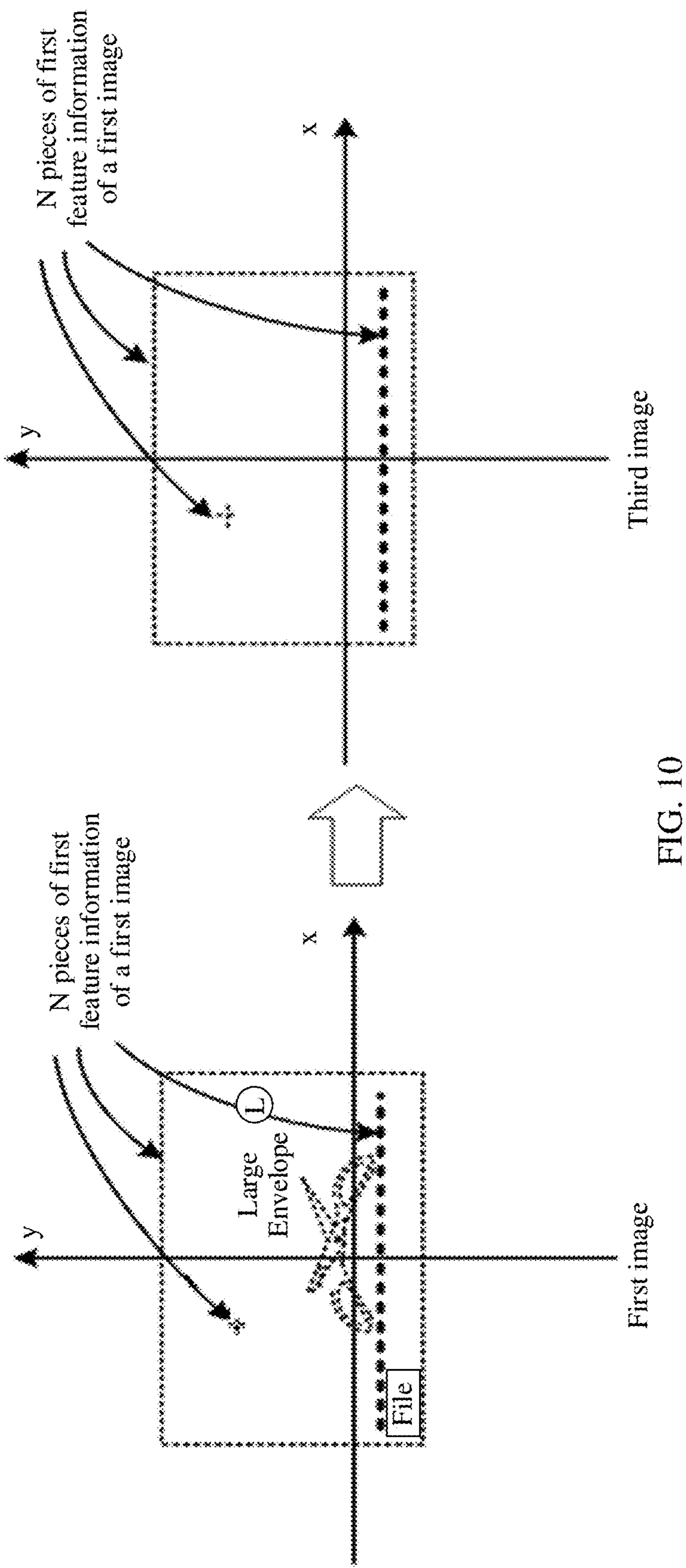
FIG. 10 is a schematic diagram of obtaining feature information of an optical image according to an embodiment of this application.

Example 1: Before the mobile phone 100 fuses the first image and the second image, the mobile phone 100 may perform N times of feature information extraction on the first image to obtain N pieces of first feature information, where N is an integer greater than or equal to 1 As shown in FIG. 8, the mobile phone 100 may extract contour information on the paper bag and a key identifier (for example, pattern information on the paper bag) on the paper bag shown in FIG. 8 as the feature information. Alternatively, the mobile phone 100 may increase transparency of the first image. Because a part with a darker color on the first image becomes more prominent as transparency increases, the part with the darker color may be used as the feature information. Then, the mobile phone 100 may reconstruct the first image based on the extracted feature information, to obtain the third image. For example, the third image is a point cloud image in FIG. 10. In other words, feature points are used to identify the feature information in the first image.

Then, the mobile phone 100 determines first reference information of the first image, and determines second reference information of the second image. The first reference information and the second reference information may be used to indicate a relative position relationship between the line-of-sight object and the non-line-of-sight object.

Figure 9:
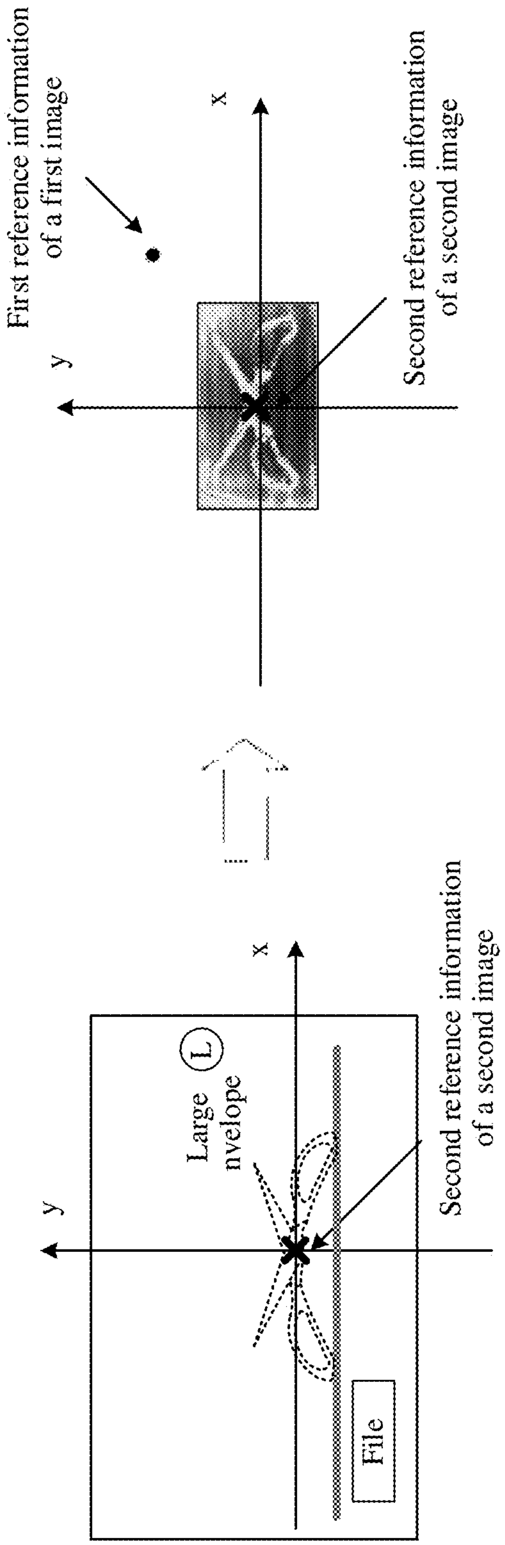
FIG. 9 is another schematic diagram of a relative position relationship between an optical image and an electromagnetic image according to an embodiment of this application.

For example, in the scenario shown in FIG. 1, the first reference information may be first coordinates on the first image, and the second reference information may be second coordinates on the second image. For example, the first coordinates and the second coordinates may be the same. As shown in FIG. 8, "X" in FIG. 8 represents the first coordinates and the second coordinates. The first coordinate and the second coordinate may also be different. As shown in FIG. 9, "." in FIG. 9 represents the first coordinate, and "X" represents the second coordinate. Alternatively, the first reference information may be a first coordinate system established on the first image, and an origin of the first coordinate system is referred to as a first origin, or it may be understood that the first reference information is the first origin of the first coordinate system. The second reference information may be a second coordinate system established on the second image, and an origin of the second coordinate system is referred to as a second origin, or it may also be understood that the second reference information is the second origin of the second coordinate system. The first origin and the second origin are a same point. As shown in FIG. 8, "X" represents the first origin and the second origin. The first origin and the second origin are two different points. As shown in FIG. 9, "." represents the first origin, and "X" represents the second origin. It should be understood that, in FIG. 9, relative position offsets between the first coordinates and the second coordinates are known, or relative position offsets between the first origin and the second origin are known.

It should be understood that, a position of the feature information such as the contour, the pattern, or the identifier of the line-of-sight object on the first image is fixed relative to the first reference information, and the second reference information is fixed relative to the first reference information. Therefore, position of the non-line-of-sight object in the imaging space may be located by using the feature information of the first image, the first reference information, and the second reference information.

Figure 11:
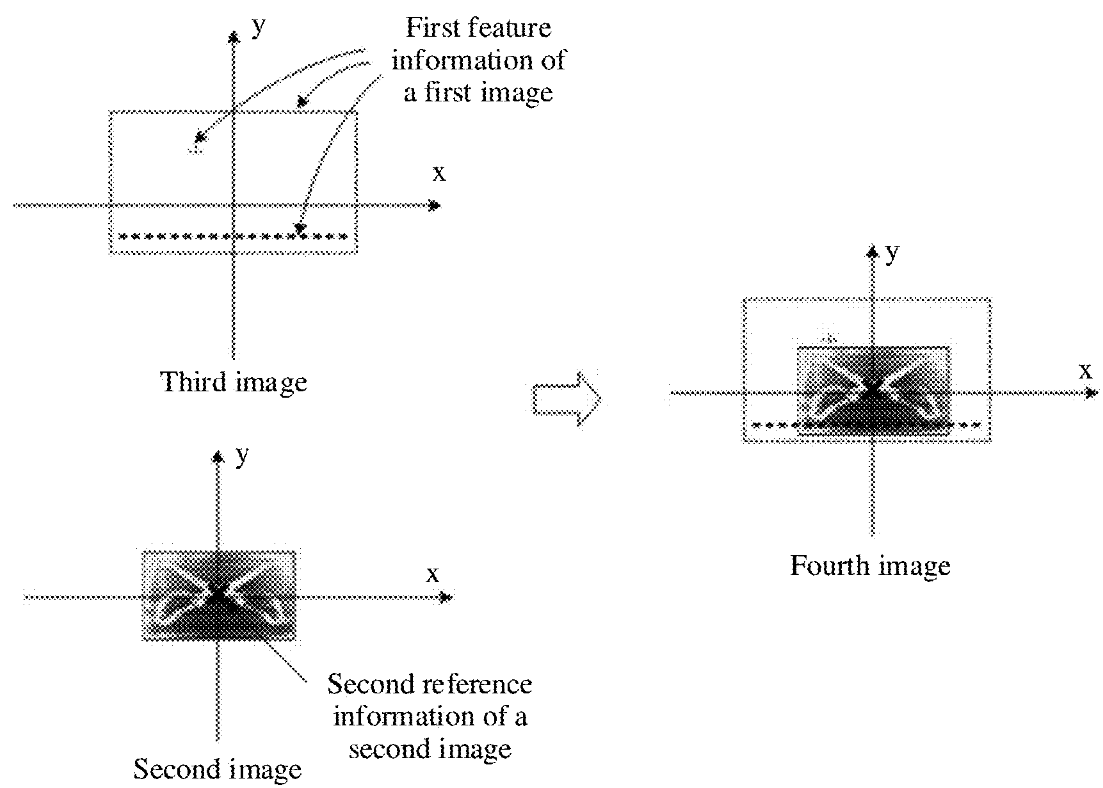
FIG. 11 is a schematic diagram of fusing of an optical image and an electromagnetic image according to an embodiment of this application.

As shown in FIG. 11, the mobile phone 100 may fuse the first image and the second image based on the first reference information and the second reference information, that is, fuse the third image and the second image, to obtain a final image. For example, in FIG. 11, the first reference information is a first coordinate system, the second reference information is a second coordinate system, and an origin of the first coordinate system coincides with an origin of the second coordinate system.

It should be understood that the final image includes a plurality of pieces of first feature information and/or a plurality of pieces of second feature information, and may indicate a position between the non-line-of-sight object and the line-of-sight object. In other words, the final image includes position information between the non-line-of-sight object and the line-of-sight object, and the position information includes the plurality of pieces of the first feature information and/or the plurality of pieces of the second feature information. In some embodiments, the position information included in the final image may include the first reference information and/or the second reference information. For example, the position information may be plane position information, for example, the first reference information or feature information (point cloud) on the third image.

It should be noted that the performing N times of feature information extraction on the first image may also be understood as extracting the first reference information established based on the first image. From this perspective, the first feature information may include the first reference information. In other words, in addition to visual information such as contour information of the line-of-sight object, the first feature information further includes information such as a reference coordinate system established on the first image. Because the first feature information and/or the second feature information may be feature information in a same plane, or may be feature information in different planes, from this perspective, the position information may represent a plane position relationship between the non-line-of-sight object and the line-of-sight object, and also represent a space position relationship between the non-line-of-sight object and the line-of-sight object.

An imaging proportion of the mobile phone 100 for the line-of-sight object may be different from an imaging proportion of the mobile phone 100 for the non-line-of-sight object. In other words, a first imaging proportion of the line-of-sight object and the first image is different from a second imaging proportion of the non-line-of-sight object and the second image. Further, the mobile phone 100 may determine the first reference information and the second reference information based on imaging proportions of the first image and the second image, to determine a relative position relationship between the non-line-of-sight object and the line-of-sight object. It should be understood that, if the mobile phone 100 may determine the first reference information and the second reference information based on the imaging proportions of the first image and the second image, position information included in the fused fourth image may further include size proportion information of the non-line-of-sight object and the line-of-sight object, for example, the imaging proportions of the first image and the second image.

Figure 12:
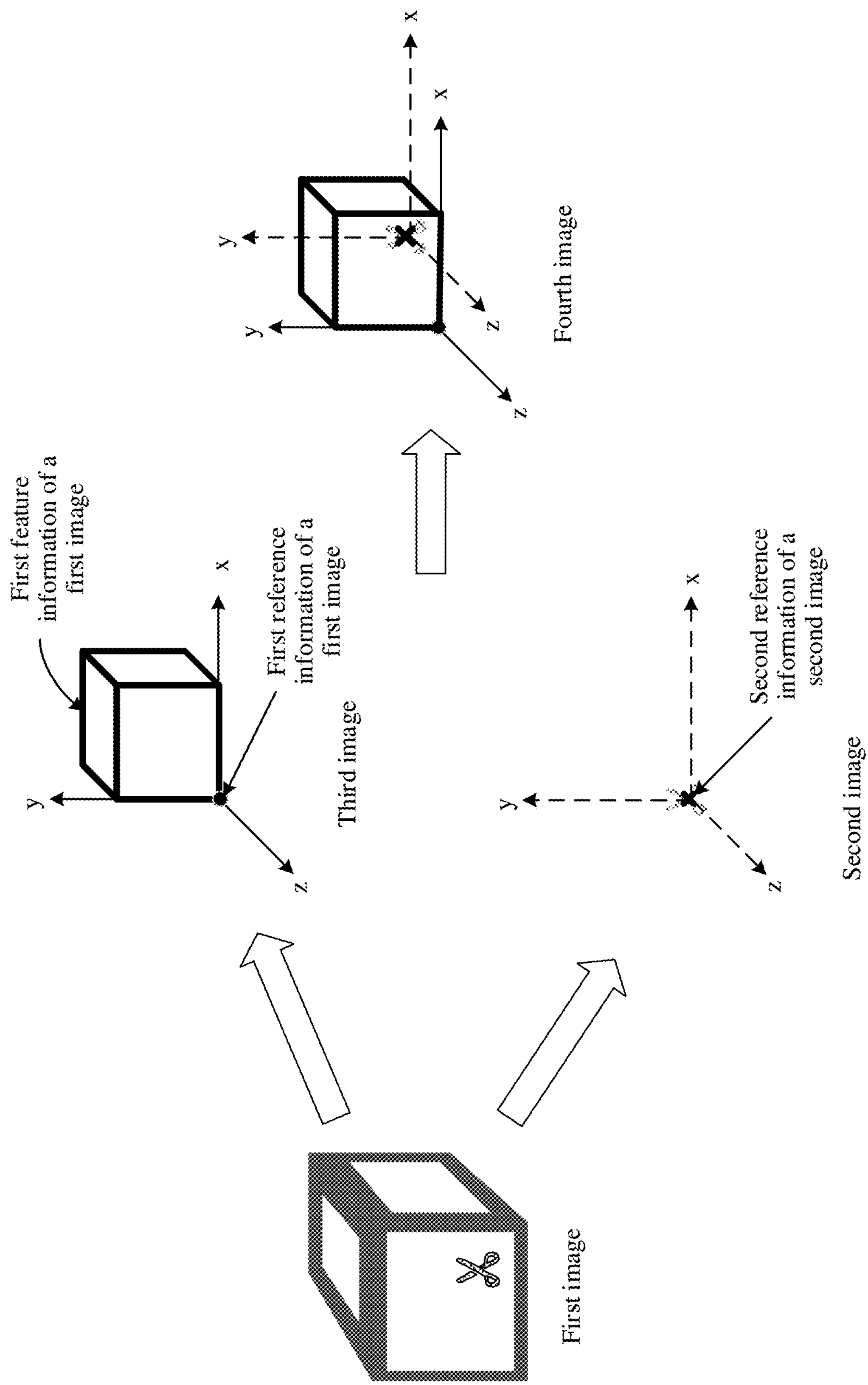
FIG. 12 is another schematic diagram of fusing of an optical image and an electromagnetic image according to an embodiment of this application.

For another example, in the scenario shown in FIG. 4, the first reference information may be a first origin of a first coordinate system on the first image, and the second reference information may be a second origin of a second coordinate system on the second image. As shown in FIG. 12, "." in FIG. 12 represents a first origin, "X" represents a second origin, and a relative position offset between the first origin and the second origin is known.

The first image is an image of the box. The mobile phone 100 performs N times of feature information extraction on the first image, to obtain feature information such as a contour of the box on the first image (which is shown by using dashed lines in FIG. 12). A position of the contour feature information relative to the first reference information is fixed. Therefore, an image reconstructed based on the contour feature information is the third image in FIG. 12. Because the second reference information is fixed relative to the first reference information, as shown in FIG. 12, the third image and the second image are fused based on the first reference information and the second reference information, to obtain a final image. It should be understood that the final image includes position information between the non-line-of-sight object and the line-of-sight object. The position information may be space position information, for example, the first reference information and/or the second reference information, that is, the first coordinate system and the second coordinate system, and indicates a space position relationship between the non-line-of-sight object and the line-of-sight object.

It should be understood that, similar to the previous example, the mobile phone 100 may determine the first reference information and the second reference information based on imaging proportions of the first image and the second image, to determine a relative position relationship between the non-line-of-sight object and the line-of-sight object. In this case, position information included in the fused final image may further include size proportion information of the non-line-of-sight object and the line-of-sight object, for example, an imaging proportion of the first image and an imaging proportion of the second image.

Example 2: A difference from Example 1 lies in that, in this example, before the mobile phone 100 fuses the first image and the second image, the mobile phone 100 may perform M times of feature information extraction on the second image, to obtain M pieces of feature information, where M is a positive integer. As shown in FIG. 8, the mobile phone 100 may extract all or some contour information of scissors on the paper bag shown in FIG. 8 as the feature information. Then, the mobile phone 100 may reconstruct the second image based on the extracted feature information, to obtain the fourth image, for example, a scissors image shown in FIG. 8.

Similar to Example 1, the mobile phone 100 determines the first reference information of the first image and determines the second reference information of the second image. For details, refer to related descriptions in Example 1. Details are not described herein again. Then, the mobile phone 100 fuses the first image and the fourth image based on the first reference information and the second reference information, to obtain a final image. Specifically, similar to example 1, details are not described herein again. Similar to Example 1, the second feature information may include the second reference information.

Example 3: In this example, before the mobile phone 100 fuses the first image and the second image, the mobile phone 100 may perform N times of feature information extraction on the first image to obtain N pieces of feature information, where N is a positive integer; and perform M times of feature information extraction on the second image to obtain M pieces of feature information, where M is a positive integer. It should be noted that a sequence of performing feature information extraction on the first image and performing feature information extraction on the second image by the mobile phone 100 is not limited in this embodiment of this application. Feature information extraction may be performed on the first image first, or feature information extraction may be performed on the second image first, or feature information extraction may be performed on both the first image and the second image. For a process of performing feature information extraction on of the first image and the second image, refer to the foregoing example 1 and example 2. Details are not described herein again.

Similar to Example 1 and Example 2, the mobile phone 100 then determines the first reference information of the first image and determines the second reference information of the second image. For details, refer to related descriptions in Example 1. Details are not described herein again. Then, the mobile phone 100 fuses the third image and the fourth image based on the first reference information and the second reference information, to obtain a final image.

It should be noted that, the foregoing uses an example in which feature information extraction is performed on the first image and/or the second image, and then the first reference information and the second reference information is determined. In some other embodiments, the mobile phone 100 may first determine the first reference information and the second reference information, and then perform feature information extraction on the first image and/or the second image.

S506: Display the final image in the viewfinder interface.

It should be noted that when the mobile phone 100 displays the viewfinder interface of the camera application, the optical camera and the electromagnetic sensor may capture an image in real time. The mobile phone 100 may use the foregoing process (specifically, S505) each time the optical camera and the electromagnetic sensor capture an image, to obtain a final image, and displays the final image in the viewfinder interface. In other words, a preview image in the viewfinder interface of the camera application is an image obtained by the mobile phone 100 by performing S505 based on images captured by the optical camera and the electromagnetic sensor.

Alternatively, in some embodiments, the mobile phone 100 first displays a preview image in the viewfinder interface, and the preview image may be, for example, the second image captured by the electromagnetic sensor. If the second image is clear and can express information adequately for a user, the first image and the second image might not be fused. The mobile phone 100 may output prompt information, where the prompt information prompts whether to fuse the first image and the second image. When receiving an instruction for determining to fuse the first image and the second image, the mobile phone 100 uses the foregoing process (specifically, S505) to obtain a final image, and displays the final image in the viewfinder interface.

In some other embodiments, the mobile phone 100 first displays a preview image in the viewfinder interface, and the preview image may be, for example, the first image captured by the optical camera. If the mobile phone 100 is automatically triggered to enter the first imaging mode, but the user may actually want the first image and does not care about the second image, the image and the second image might not be fused. The mobile phone 100 may output the prompt information, where the prompt information prompts whether to fuse the first image and the second image. When receiving the instruction for determining to fuse the first image and the second image, the mobile phone 100 uses the foregoing process (specifically, S505) to obtain the final image, and displays the final image in the viewfinder interface.

It should be understood that the mobile phone 100 enters the first imaging mode. If the optical camera is first used to capture the first image, the preview image displayed by the mobile phone 100 may be the first image. If the electromagnetic sensor is first used to capture the second image, the preview image displayed by the mobile phone 100 may be the second image. If both the electromagnetic sensor and the optical camera are used to capture corresponding images, the preview image displayed by the mobile phone 100 may be the first image or the second image. Whether the first image or the second image is displayed may be, for example, selected by the mobile phone 100 by default. For example, by setting some parameters of the mobile phone 100, the mobile phone 100 chooses to display an optical image by default. For another example, the mobile phone 100 may choose to display the first image or the second image based on a habit of the user. If a user uses the first imaging mode mostly to obtain a fused image of the first image and the second image, the mobile phone 100 may preferably display the second image. If a user uses the first imaging mode mostly to obtain the first image, the mobile phone 100 may preferably display the first image.

Example 2: The mobile phone 100 photographs an image from a plurality of angles of view.

Considering that a volume of the to-be-imaged object is large, for example, the box shown in FIG. 4 has a large volume, and an angle of view of each photographing performed by the mobile phone 100 is limited, imaging of the non-line-of-sight object cannot be implemented when the mobile phone 100 performs photographing once. In this case, the mobile phone 100 may photograph the non-line-of-sight object for a plurality of times, and each time of photographing, a position of the mobile phone 100 relative to the non-line-of-sight object may be correspondingly adjusted. In other words, the photographing angle of view of the mobile phone 100 is adjusted, to implement imaging of the non-line-of-sight object.

A difference between Example 2 and Example 1 lies in that after the mobile phone 100 enters the first imaging mode, the third input operation in S503 is an operation used to indicate to perform multi-angle photographing or panoramic imaging.

In some embodiments, the third input operation may be an operation of tapping a multi-angle photographing icon or a panoramic imaging icon in the camera display interface. It should be understood that a name of an icon corresponding to the third input operation, for example, the multi-angle photographing icon and the panoramic imaging icon, is not limited in this embodiment of this application. Certainly, the third input operation may be another operation, for example, an operation of sliding down on the viewfinder display interface or an operation of pressing and holding a volume button, to indicate to perform multi-angle photographing. The third input operation is not limited in this embodiment of this application. It should be understood that, when detecting the third input operation, the electronic device may enter the multi-angle mode, that is, a mode in which the non-line-of-sight object is photographed from the plurality of angles of view.

In some other embodiments, after the mobile phone 100 enters the first imaging mode, if the mobile phone 100 detects that the mobile phone 100 is moving, it is considered that multi-angle photographing may be appropriate. In this case, the mobile phone 100 actively starts the multi-angle mode. For example, the mobile phone 100 may detect, through a sensor disposed in the mobile phone 100, for example, a posture sensor and/or an acceleration sensor, that the mobile phone 100 moves, and then the mobile phone 100 starts the multi-angle mode.

The following separately provides two scenarios to describe a process of starting the multi-angle mode by the mobile phone 100.

Figure 13:
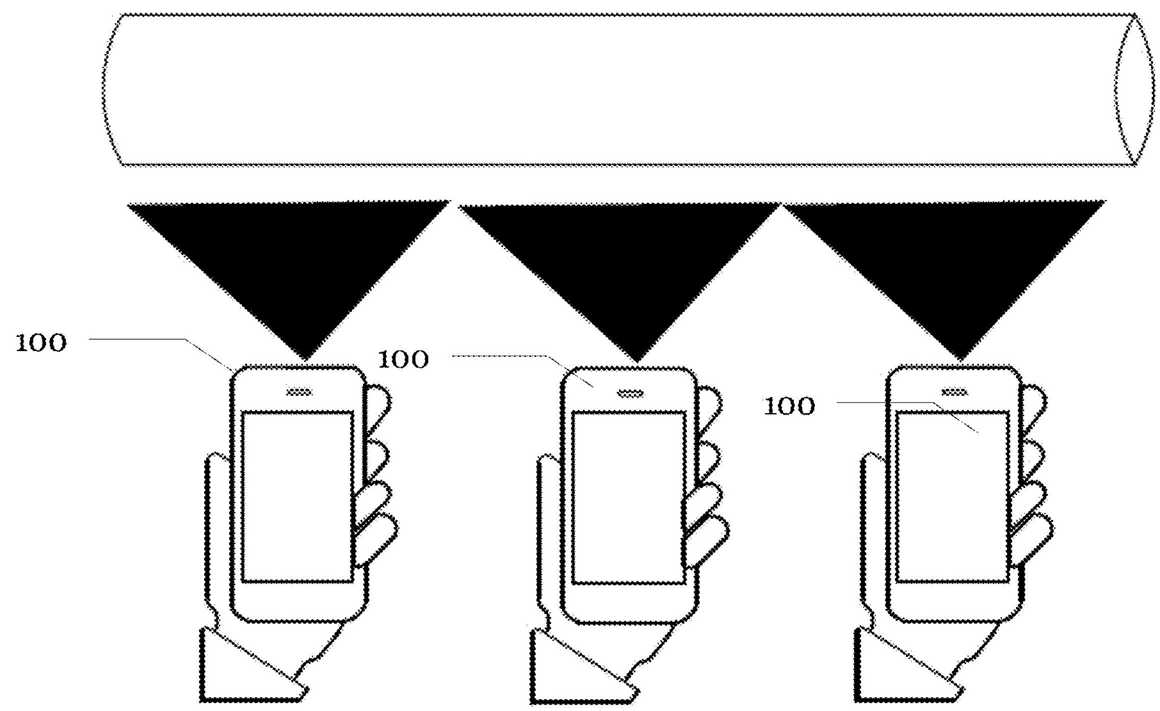
FIG. 13 is an imaging scenario of a non-line-of-sight object according to an embodiment of this application.

Scenario 1: FIG. 13 is a schematic diagram of multi-angle photographing.

After entering the first imaging mode, the mobile phone 100 may determine, by detecting a movement track of the mobile phone 100, whether to automatically trigger multi-angle photographing. For example, the mobile phone 100 may detect that the mobile phone 100 keeps moving within preset duration, consider to perform multi-angle photographing, and automatically start the multi-angle mode. It should be understood that moving of the mobile phone 100 may be a change in space displacement of the mobile phone 100, or may be a change in a rotation angle of the mobile phone 100.

In some embodiments, the mobile phone 100 moves for a plurality of times, for example, changes from a motion status to a static status, and then changes from the static status to the motion status. In other words, the mobile phone 100 may not continuously move. In this case, the mobile phone 100 may also be considered to keep moving. Therefore, in some embodiments, when the mobile phone 100 detects that a length of a path or an amplitude on which the mobile phone 100 moves within the preset duration is greater than a preset threshold, for example, a preset first threshold, it may be considered that the mobile phone 100 keeps moving within the preset duration. Alternatively, if the mobile phone 100 detects that a quantity of movement times of the mobile phone 100 within the preset duration is greater than a preset threshold, and the length of the movement path is greater than the preset threshold, it may be considered that the mobile phone 100 keeps moving within the preset duration. In this way, moving the mobile phone 100 due to some reasons may be avoided. For example, in a single-angle photographing scenario, the mobile phone 100 may move once or move along a long path to align with a to-be-imaged object, and is mistaken for that multi-angle photographing is appropriate, that is, the multi-angle mode is mistakenly triggered. It should be understood that the mobile phone 100 changes from the motion status to the static status, and the mobile phone 100 moves once. Alternatively, the mobile phone 100 changes from the static status to the motion status, and the mobile phone 100 moves once.

The mobile phone 100 may move to aim at the to-be-imaged object, but is not intended for multi-angle photographing. Therefore, in some embodiments, before starting the multi-angle mode, the mobile phone 100 may output prompt information, for example, "whether to enter the multi-angle mode," and start the multi-angle mode when detecting an operation that is entered by the user to determine to enter the multi-angle mode. In this way, mistaken triggering of the mobile phone 100 can be avoided as much as possible.

Figure 14:
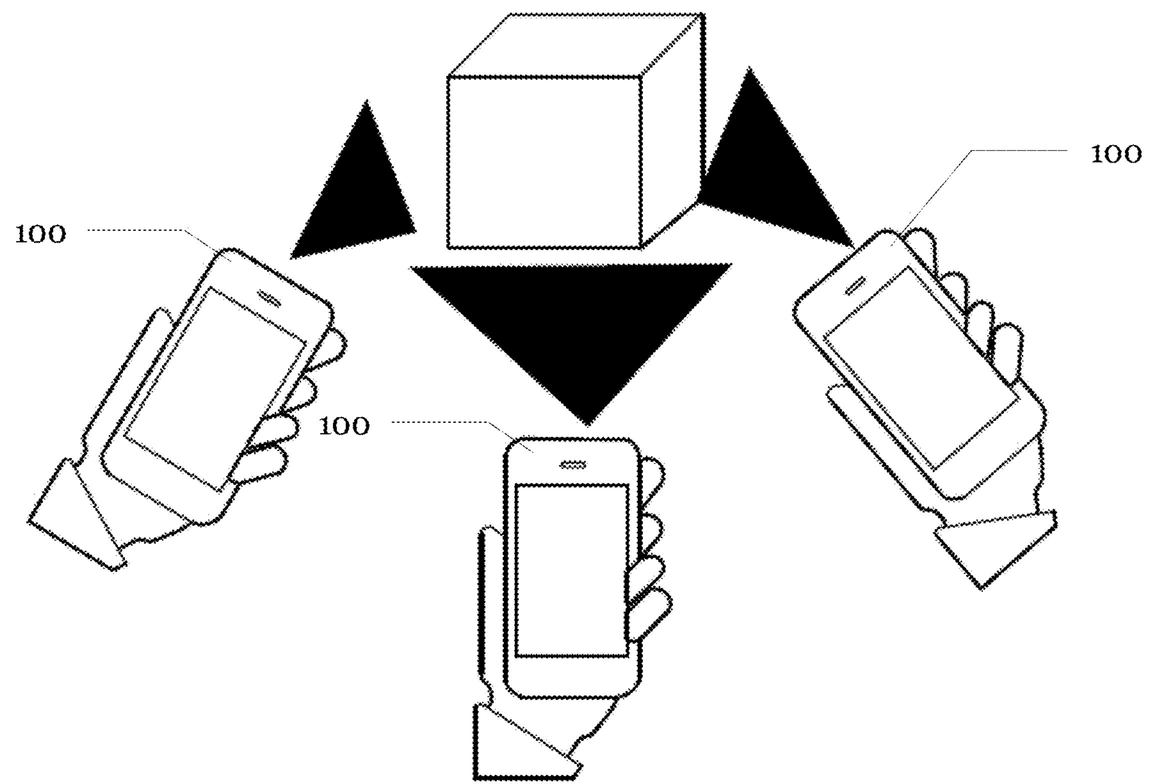
FIG. 14 is another imaging scenario of a non-line-of-sight object according to an embodiment of this application.

Scenario 2: FIG. 14 is another schematic diagram of multi-angle photographing.

A difference from the scenario 1 lies in that, in the scenario 2, the mobile phone 100 may move around a to-be-imaged object. The mobile phone 100 may start the multi-angle mode by detecting a length of a moving path of the mobile phone 100 within preset duration. In addition, the mobile phone 100 may start the multi-angle mode by detecting a rotation angle of the mobile phone 100. For example, the mobile phone 100 detects, through the posture sensor and/or the acceleration sensor, that the rotation angle of the mobile phone 100 is greater than a preset threshold within preset duration, and starts the multi-angle mode.

After starting the multi-angle mode, the mobile phone 100 may capture the second image by using the optical camera, and capture the third image by using the electromagnetic sensor.

Specifically, after the mobile phone 100 enters the multi-angle mode, auxiliary prompt information may be displayed in the display interface. The auxiliary prompt information may indicate to the user how to move the electronic device, that is, a rule for moving the electronic device. For example, the mobile phone 100 may be moved along a length direction of the mobile phone 100 or along a width direction of the mobile phone 100. In this case, the auxiliary prompt information may be a straight line along a direction. For another example, the auxiliary prompt information may be a curve or a rotation angle. The user may move the mobile phone 100 based on a track indicated by the auxiliary prompt information, to ensure, as much as possible, fusion performance of the mobile phone 100 for the first image captured by the optical camera and the second image captured by the electromagnetic sensor.

When photographing a non-line-of-sight object, the mobile phone 100 keeps moving. When detecting an input fourth input operation, the mobile phone 100 captures the first image by using the optical camera, and captures the second image by using the electromagnetic sensor. In this case, an image obtained by the mobile phone 100 includes both the first image and the second image. The fourth input operation is similar to the foregoing example. The mobile phone 100 may detect the fourth input operation of the user on the display 194 through the touch sensor 180K disposed on the display 194. The fourth input operation may be an operation of tapping the photographing icon in the camera display interface. Certainly, the fourth input operation may alternatively be another operation, for example, an operation of sliding up on the viewfinder display interface or an operation of pressing and holding the volume button, provided that the third input operation can be an operation of triggering photographing. This is not limited in this embodiment of this application. Alternatively, the mobile phone 100 may move intermittently, that is, the mobile phone 100 changes from a static status to a motion status, changes from the motion status to the static status, and then changes from the static status to the motion status, and so on. In this case, if the mobile phone 100 detects that the mobile phone 100 changes from the motion status to the static status, the mobile phone 100 photographs the to-be-imaged object at a current angle of view of the mobile phone 100. In other words, the mobile phone 100 captures the first image by using the optical camera, and captures the second image by using the electromagnetic sensor, so that the mobile phone 100 can obtain images at a plurality of angles of view. It should be understood that the image of each angle of view includes both the first image and the second image.

It should be understood that, in an image photographing scenario, the optical camera and the electromagnetic sensor may continuously capture images in real time. Therefore, a preview image in the viewfinder interface dynamically changes. The preview image may display the first image or the second image. Certainly, the electronic device may also splice or fuse the first image and the second image in real time. The preview image may also be a fused image of the first image and the second image. The user may perform the fourth input operation on the preview image displayed in the viewfinder interface. For example, the user may perform the fourth input operation on the first image and/or the second image, or on the fused image of the first image and the second image, to obtain an actually requested image.

After obtaining the images of the plurality of angles of view, the mobile phone 100 may splice and fuse the images of the plurality of angles of view to obtain a final image. For ease of distinguishing, the first image herein is referred to as an optical image, and the second image is referred to as an electromagnetic image. Images including four angles of view are used as an example. The images at the four angles of view are respectively a first optical image and a first electromagnetic image at a first angle of view, a second optical image and a second electromagnetic image at a second angle of view, a third optical image and a third electromagnetic image at a third angle of view, and a fourth optical image and a fourth electromagnetic image at a fourth angle of view. It should be understood that there may be no electromagnetic image in one or more angles of view.

The mobile phone 100 may sequentially splice the first optical image, the second optical image, the third optical image, and the fourth optical image. For example, the mobile phone 100 may splice the first optical image, the second optical image, the third optical image, and the fourth optical image in an order of photographing start moments. Similarly, the mobile phone 100 splices the first electromagnetic image, the second electromagnetic image, the third electromagnetic image, and the fourth electromagnetic image. The mobile phone 100 fuses the spliced optical image and the electromagnetic image. For details, refer to the foregoing image fusion manner. Details are not described herein again. Alternatively, the mobile phone 100 may first fuse the optical images and the electromagnetic images in the four angles of view in the foregoing image fusion manner, and then splice the fused images in the angles of view, to obtain a final image.

After displaying the first image, the mobile phone 100 may delete the first image captured by the optical camera and/or the second image captured by the electromagnetic sensor, to save storage space of the mobile phone 100 as much as possible. For example, the mobile phone 100 may delete the first image and/or the second image based on an actual specification of the user, that is, store only the first image and/or the second image adequate for the user. For example, in the multi-angle mode, the optical camera captures first images at a plurality of angles of view, and the electromagnetic sensor captures second images at a plurality of angles of view. In other words, there are a plurality of first images and second images. After fusing the plurality of first images and the plurality of second images, the mobile phone 100 detects an input fifth input operation, and in response to the fifth input operation, deletes some or all of the plurality of first images and deletes some or all of the plurality of second images. In other words, a part of the first image and/or a part of the second image are/is included based on a specification of the user, to facilitate subsequent viewing by the user.

According to the imaging method for the non-line-of-sight object provided in this embodiment of this application, with assistance of an optical image, an electromagnetic image of the non-line-of-sight object can be clearer in imaging space, for example, a relative position of the non-line-of-sight object can be determined, thereby improving readability of the electromagnetic image. The implementations of this application may be combined randomly to achieve different technical effects.

In the embodiments provided in this application, the method provided in the embodiments of this application is described from a perspective of the electronic device (the mobile phone 100) used as an execution entity. To implement functions in the method provided in the embodiments of this application, a terminal device may include a hardware structure and/or a software module, to implement the functions in a form of a hardware structure, a software module, or a hardware structure and a software module. Whether a specific function in the foregoing functions is performed by using the hardware structure, the software module, or the combination of the hardware structure and the software module depends on a specific application and a design constraint of the technical solutions.

Figure 15:
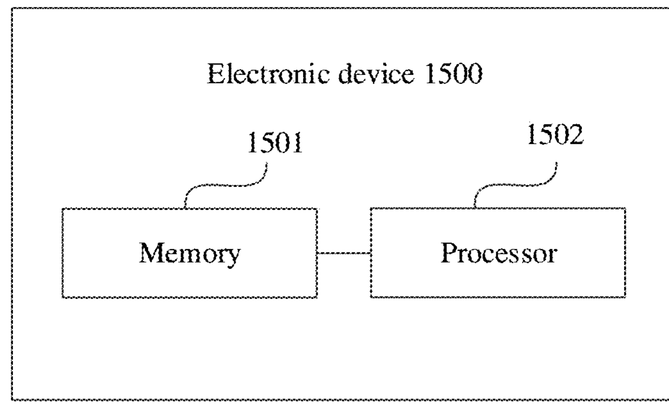
FIG. 15 is a schematic diagram of a structure of an electronic device according to embodiment of this application.

Based on a same technical concept, this application further provides an electronic device 1500, configured to perform the methods provided in the foregoing embodiments of this application. As shown in FIG. 15, the electronic device 1500 may include a memory 1501 and a processor 1502. The memory 1501 is configured to store program instructions, and the processor 1502 is configured to invoke the program instructions stored in the memory 1501, to implement the imaging method for a non-line-of-sight object in embodiments of this application. For example, the memory 1501 stores program instructions for performing the imaging method for the non-line-of-sight object shown in FIG. 5. The processor 1502 invokes the program instructions that are stored in the memory 1501 and that are for performing the imaging method for the non-line-of-sight object shown in FIG. 5, to perform imaging of the non-line-of-sight object shown in FIG. 5.

In this embodiment of this application, the processor 1502 may be a general purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory (RAM), a flash memory, a read-only memory (ROM), a programmable read-only memory, an electrically erasable programmable memory, or a register. The storage medium is located in the memory, and a processor reads instructions in the memory and completes the steps in the foregoing methods in combination with hardware of the processor.

Figure 16:
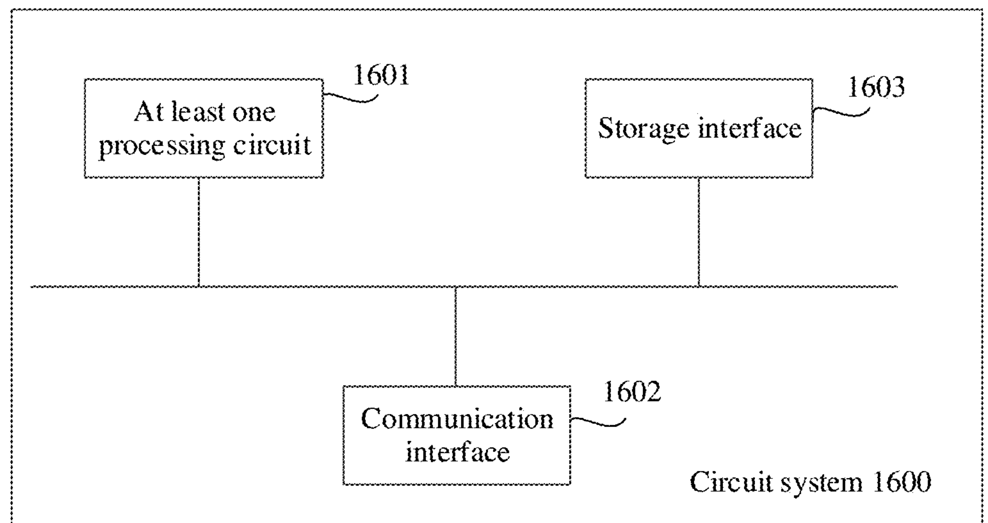
FIG. 16 is a schematic diagram of a structure of a circuit system according to embodiment of this application.

FIG. 16 is a schematic diagram of a structure of a circuit system according to embodiment of this application. The circuit system may be one or more chips, for example, an SoC chip. In some embodiments, the circuit system may be a component in an electronic device (for example, the mobile phone 100 shown in FIG. 2). As shown in FIG. 16, a circuit system 1600 may include at least one processing circuit 1601, a communication interface 1602, and a storage interface 1603. In some embodiments, the circuit system 1600 may further include a memory (not shown in the figure) and the like.

The at least one processing circuit 1601 may be configured to perform all or some of the steps in the embodiment shown in FIG. 5. The at least one processing circuit 1601 may include an AP, a modem processor, a GPU, an ISP), a controller, a memory, a video codec, a DSP, a baseband processor, and/or an NPU, and the like.

In some embodiments, for example, an NPU and an ISP are integrated into the at least one processing circuit 1601. All or some of the steps in the embodiment shown in FIG. 5 may be performed by different processing circuits 1601. For example, in the foregoing process, a process of performing image fusion (for example, all or some of the steps in FIG. 5) may be performed by the NPU, and another process (for example, S505 in the embodiment shown in FIG. 5) may be performed by the ISP.

The communication interface 1602 may be configured to implement communication between the circuit system 1600 and another component/device. For example, the communication interface 1602 may be a wireless communication interface (for example, a Bluetooth communication interface or a wireless communication interface). For example, the circuit system 1600 is a component of a mobile phone 100. The circuit system 1600 may be connected to a wireless communication module and/or a mobile communication module through the communication interface 1602.

The storage interface 1603 is configured to implement data transmission (for example, data reading and writing) between the circuit system 1600 and another component (for example, a memory). For example, the circuit system 1600 is a component of the mobile phone 100. The circuit system 1600 may access, through the storage interface 1603, data stored in an internal memory 121.

It should be noted that, in this embodiment of this application, unit division is an example, and is merely logical function division. During actual implementation, another division manner may be used. Functional units in embodiments of the present disclosure may be integrated into one processing unit, or each of the units may exist alone physically, or two or more units are integrated into one unit. For example, in the foregoing embodiments, a first obtaining unit and a second obtaining unit may be one unit, or may be different units. The integrated unit may be implemented in a form of hardware, or may be implemented in a form of a software function unit.

An embodiment of this application further provides a computer-readable storage medium. The storage medium may include a memory. The memory may store a program. When the program is executed, an electronic device is enabled to perform all the steps recorded in the method embodiment shown in FIG. 5.

An embodiment of this application further provides a computer program product. When the computer program product runs on an electronic device, the electronic device is enabled to perform all or some of the steps recorded in the method embodiment shown in FIG. 5.

According to context, the term "when . . . " or "after . . . " used in the foregoing embodiments may be interpreted as a meaning of "if . . . ," "after . . . ," "in response to determining . . . ," or "in response to detecting . . . ." Similarly, according to the context, the phrase "when it is determined that . . . " or "if (a stated condition or event) is detected" may be interpreted as a meaning of "if it is determined that . . . ," "in response to determining . . . ," "when (a stated condition or event) is detected," or "in response to detecting (a stated condition or event)." In addition, in the foregoing embodiments, relationship terms such as first and second are used to distinguish one entity from another entity, but do not limit any actual relationship and sequence between these entities.

The term "and/or" in embodiments describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In addition, in the description of the embodiments of the present disclosure, words such as "first" and "second" are merely used for distinction and description, and shall not be understood as an indication or implication of relative importance or an indication or implication of an order.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The available medium may be a magnetic medium (for example, a floppy disk, a hard disk, or a magnetic tape), an optical medium (for example, a DVD), a semiconductor medium (for example, a solid-state drive Solid-State Drive (SSD)), or the like.

It should be noted that a part of the present patent application document includes content protected by the copyright. The copyright owner reserves the copyright except copies made for the patent documents or the recorded content of the patent documents in the Patent Office.

For a purpose of explanation, the foregoing description is described with reference to a specific embodiment. However, the foregoing example discussion is not intended to be detailed, and is not intended to limit this application to a disclosed precise form. Based on the foregoing teaching content, many modification forms and variation forms are possible. Embodiments are selected and described to fully illustrate the principles of this application and practical application of the principles, so that other persons skilled in the art can make full use of this application and various embodiments that have various modifications applicable to conceived specific usage.

What is claimed is:

1. A method, comprising:

detecting, by an electronic device, a first input operation, the electronic device comprising an optical camera and an electromagnetic sensor, wherein the first input operation triggers detecting of a macro scenario on the electronic device, wherein an imaging mode corresponding to the macro scenario is automatically entered based on distance data associated with the electronic device or captured image data captured using the electronic device; and generating, by the electronic device in response to the first input operation that triggers detecting of the macro scenario, first image data, wherein the first image data comprises imaging data of a non-line-of-sight object obtained by fusing second image data and third image data, the first image data comprises position information between the non-line-of-sight object and a line-of-sight object, the second image data is imaging data of the line-of-sight object captured by the optical camera, and the third image data is imaging data of the non-line-of-sight object captured by the electromagnetic sensor, wherein the position information is based on a first coordinate system and a second coordinate system, the first coordinate system established based on processing of at least one feature in the second image data, and the second coordinate system established based on processing of at least one feature in the third image data, and the first coordinate system and the second coordinate system indicate a space position relationship between the non-line-of-sight object and the line-of-sight object.

2. The method according to claim 1, wherein the position information comprises:

plane position information that comprises a plane relative position relationship between the non-line-of-sight object and the line-of-sight object; or space position information that comprises a space relative position relationship between the non-line-of-sight object and the line-of-sight object.

3. The method according to claim 1, wherein the position information comprises size proportion information of the non-line-of-sight object and the line-of-sight object, wherein the size proportion information is based on an imaging proportion of the electronic device for the line-of-sight object and an imaging proportion of the electronic device for the non-line-of-sight object.

4. The method according to claim 2, further comprising fusing the second image data and the third image data, wherein fusing the second image data and the third image data comprises:

performing N times of feature information extraction on the second image data to obtain N pieces of first feature information, N being an integer greater than or equal to 1, or performing M times of feature information extraction on the third image data to obtain M pieces of second feature information, M being an integer greater than or equal to 1; and fusing the second image data and the third image data based on first reference information of the second image data, second reference information of the third image data, and the N pieces of first feature information or the M pieces of second feature information, to obtain the first image data, wherein the position information comprises the N pieces of first feature information or the M pieces of second feature information, and the first reference information and the second reference information indicate a relative position relationship between the non-line-of-sight object and the line-of-sight object.

5. The method according to claim 4, wherein the first feature information comprises the first reference information, the second feature information comprises the second reference information, and the position information comprises the first reference information or the second reference information.

6. The method according to claim 1, further comprising, after responding to the first input operation:

detecting a third input operation and starting, in response to the third input operation, a multi-angle mode, the multi-angle mode being a mode in which the non-line-of-sight object is photographed from a plurality of angles of view; or determining to photograph the non-line-of-sight object from a plurality of angles of view and starting a multi-angle mode, wherein the multi-angle mode is a mode in which the non-line-of-sight object is photographed from the plurality of angles of view.

7. The method according to claim 6, wherein determining to photograph the non-line-of-sight object from a plurality of angles of view comprises:

determining, in response to determining that a distance of a movement path of the electronic device within a preset duration is greater than a first preset distance threshold, to photograph the non-line-of-sight object from the plurality of angles of view; or determining, in response to determining that a rotation angle of the electronic device within a preset duration is greater than a second rotation preset threshold, to photograph the non-line-of-sight object from the plurality of angles of view.

8. The method according to claim 1, further comprising, after generating the first image data:

detecting a fourth input operation and deleting, in response to the fourth input operation, the second image data or the third image data; or deleting the second image data or the third image data.

9. An electronic device, comprising:

an optical camera;

an electromagnetic sensor; and a processor configured to start the optical camera in response to a detected first input operation, wherein the detected first input operation triggers detecting of a macro scenario on the electronic device, wherein an imaging mode corresponding to the macro scenario is automatically entered based on distance data associated with the electronic device or captured image data captured using the electronic device;

wherein:

the optical camera is configured to capture first image data of a line-of-sight object in response to automatically entering the imaging mode corresponding to the macro scenario;

the electromagnetic sensor is configured to capture second image data of a non-line-of-sight object in response to automatically entering the imaging mode corresponding to the macro scenario; and the processor is further configured to fuse the first image data and the second image data to generate third image data, wherein the third image data is imaging data of the non-line-of-sight object obtained by fusing the first image data and the second image data, and the third image data comprises position information between the non-line-of-sight object and the line-of-sight object, wherein the position information is based on a first coordinate system and a second coordinate system, the first coordinate system established based on processing of the second image data, and the second coordinate system established based on processing of the third image data, and the first coordinate system and the second coordinate system indicate a space position relationship between the non-line-of-sight object and the line-of-sight object.

10. The electronic device according to claim 9, further comprising:

an input component configured to detect the first input operation; and a display configured to display, in a display interface, an image formed by the third image data.

11. The electronic device according to claim 9, wherein:

the position information comprises plane position information that comprises a plane relative position relationship between the non-line-of-sight object and the line-of-sight object; or space position information that comprises a space relative position relationship between the non-line-of-sight object and the line-of-sight object.

12. The electronic device according to claim 9, wherein the position information comprises size proportion information of the non-line-of-sight object and the line-of-sight object, wherein the size proportion information is based on an imaging proportion of the electronic device for the line-of-sight object and an imaging proportion of the electronic device for the non-line-of-sight object.

13. The electronic device according to claim 10, wherein the processor is further configured to:

perform N times of feature information extraction on the second image data to obtain N pieces of first feature information, N being an integer greater than or equal to 1, or perform M times of feature information extraction on the third image data to obtain M pieces of second feature information, M being an integer greater than or equal to 1; and fuse the second image data and the third image data based on first reference information of the second image data, second reference information of the third image data, and the N pieces of first feature information or the M pieces of second feature information, to obtain the first image data, wherein the position information comprises the N pieces of first feature information or the M pieces of second feature information, and the first reference information and the second reference information indicate a relative position relationship between the non-line-of-sight object and the line-of-sight object.

14. The electronic device according to claim 10, wherein the processor is further configured to:

detect, after detecting the first input operation, a third input operation and start, in response to the third input operation, a multi-angle mode, wherein the multi-angle mode is a mode in which the non-line-of-sight object is photographed from a plurality of angles of view; or determine to photograph the non-line-of-sight object from a plurality of angles of view and start a multi-angle mode, wherein the multi-angle mode is a mode in which the non-line-of-sight object is photographed from the plurality of angles of view.

15. The electronic device according to claim 14, wherein the processor is further configured to:

determine, in response to determining that a distance of a movement path of the electronic device within a preset duration is greater than a first preset distance threshold, to photograph the non-line-of-sight object from the plurality of angles of view; or determine, in response to determining that a rotation angle of the electronic device within a preset duration is greater than a second rotation preset threshold, to photograph the non-line-of-sight object from the plurality of angles of view.

16. The method according to claim 1, further comprising:

generating a fourth image comprising a reconstruction of the second image data; and generating a fifth image comprising a reconstruction of the third image data, wherein the first image data is generated by fusing the fourth image with the fifth image.

17. The method according to claim 1, wherein detecting the macro scenario comprises detecting, from within the captured image data, an object associated with the macro scenario, wherein the imaging mode corresponding to the macro scenario is automatically entered in response to detecting the object associated with the macro scenario.

18. The method according to claim 1, wherein detecting the macro scenario comprises detecting, from the captured image data or the distance data associated with the electronic device, that the electronic device is within a distance threshold from a to-be-imaged object, wherein the imaging mode corresponding to the macro scenario is automatically entered in response to detecting that the electronic device is within the distance threshold from the to-be-imaged object.

19. The method according to claim 1, wherein the position information is further based on a relationship between imaging proportion data associated with the optical camera and imaging proportion data associated with the electromagnetic sensor.

20. The method according to claim 1, further comprising:

determining first reference information associated with the first coordinate system and second reference information associated with the second coordinate system from the first image data after generating the first image data, wherein the first reference information and the second reference information are utilized for extracting at least one feature from the first image data.

* * * * *